(12) United States Patent
Imachi et al.

(10) Patent No.: US 6,272,678 B1
(45) Date of Patent: Aug. 7, 2001

(54) VERSION AND CONFIGURATION MANAGEMENT METHOD AND APPARATUS AND COMPUTER READABLE RECORDING MEDIUM FOR RECORDING THEREIN VERSION AND CONFIGURATION MANAGEMENT PROGRAM

(75) Inventors: Makoto Imachi; Toru Takahashi; Yuki Aoyama, all of Sagamihara; Yukio Hoshi, Tachikawa, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/185,645

(22) Filed: Nov. 4, 1998

(30) Foreign Application Priority Data

Nov. 5, 1997 (JP) .................................................. 9-319012

(51) Int. Cl.[7] .................................................. G06F 9/445
(52) U.S. Cl. ................................ 717/11; 717/1; 707/203; 707/511
(58) Field of Search .................... 717/11, 1; 707/511, 707/203

(56) References Cited

U.S. PATENT DOCUMENTS

| | | | |
|---|---|---|---|
| 4,558,413 | * 12/1985 | Schmidt et al. | 364/300 |
| 5,339,438 | * 8/1994 | Conner et al. | 717/5 |
| 5,619,716 | * 4/1997 | Nonaka et al. | 717/11 |
| 5,787,280 | * 7/1998 | Joseph et al. | 707/203 |
| 5,835,601 | * 11/1998 | Shimbo et al. | 380/49 |
| 5,903,897 | * 5/1999 | Carrier, III et al. | 707/203 |
| 5,974,428 | * 10/1999 | Gerard et al. | 707/203 |
| 5,987,611 | * 11/1999 | Freund | 713/201 |
| 6,131,066 | * 10/2000 | Ahrens et al. | 701/200 |
| 6,175,855 | * 1/2001 | Reich et al. | 709/202 |
| 6,185,563 | * 2/2001 | Hino | 707/8 |

OTHER PUBLICATIONS

Kilpi, "Improving Software Product Management Process: Implementation of a Product Support System", IEEE, pp. 3–12, Jan. 1998.*

Sachweh et al., "Version management for tightly integrated software engineering environments", IEEE, pp. 21–31, Apr. 1995.*

Davison et al., "A Visual Interface for a Database with Version Management", ACM, pp. 226–256, Jul. 1986.*

Puntikov et al., "AVCS: The APL Version Control System", ACM, pp. 154–161, Jun. 1995.*

* cited by examiner

Primary Examiner—Mark R. Powell
Assistant Examiner—Ted T. Vo
(74) Attorney, Agent, or Firm—Antonelli, Terry, Stout & Kraus, LLP

(57) ABSTRACT

A table of a manual for xx product (1st edition) includes component names, file names, version up mode and version numbers of a project. When the version up mode is a fixed mode, a version number in the table is fixed, while in an auto-changing mode components are edited and when a new version is prepared, a version number is updated. Versions V2 and V1 of a table of contents, versions V2 and V1 of a first chapter and the like show registered states in version information management tables. Table of contents of up to V2 is prepared, while since it is set to a fixed mode in the table, V1 thereof is fixed. In case of first chapter, when V2 thereof is prepared, it is updated to V2 in the table since it is set to auto-changing mode and the version number thereof is updated each time a new version is prepared until it is changed to a fixed mode. In this manner, versions of compositions, drawings and the like constituting a project such as a manual are managed and the relation between any versions is managed as an aggregate.

7 Claims, 28 Drawing Sheets

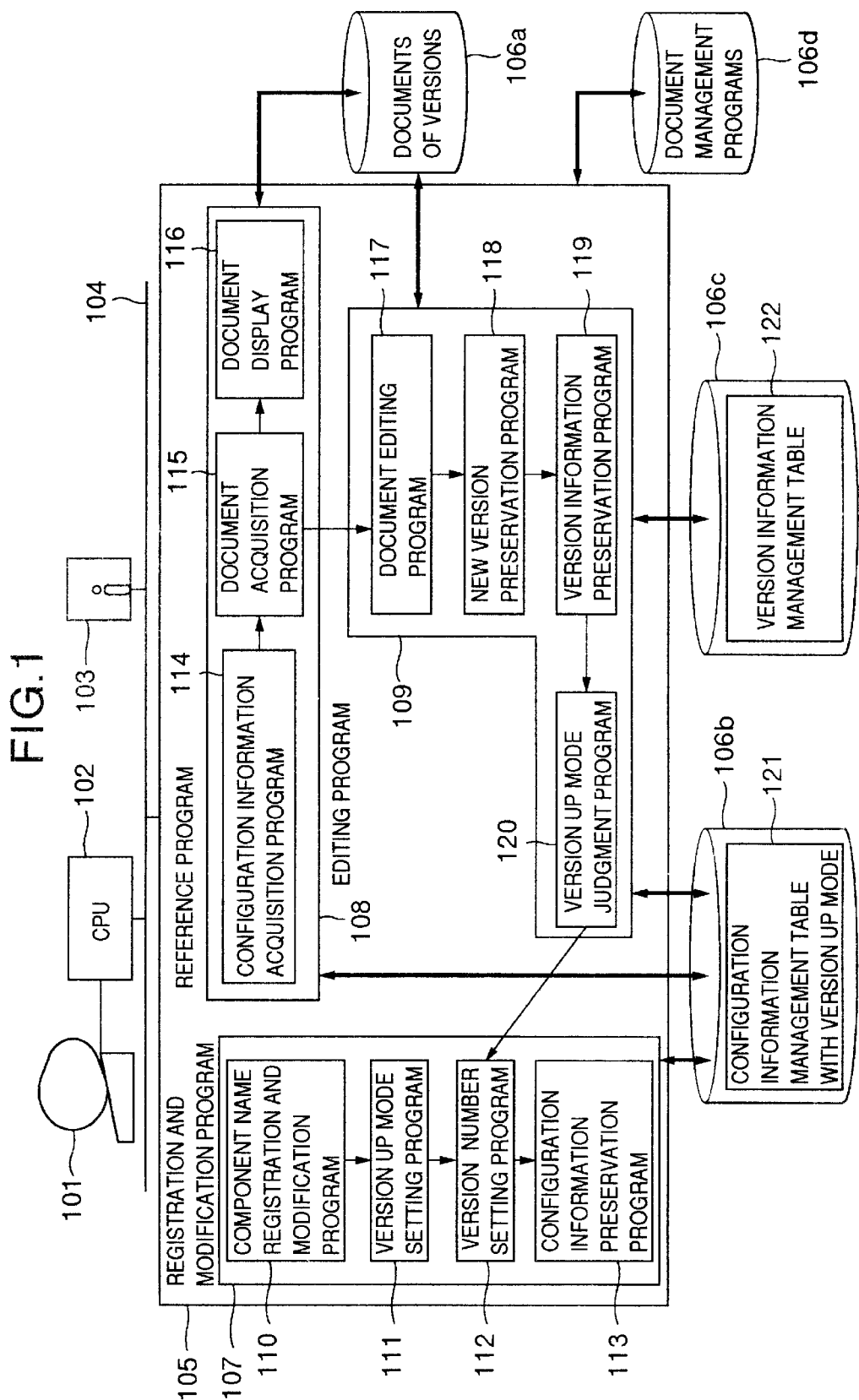

MANUAL FOR X X PRODUCT
( 1 ST EDITION )

TABLE OF CONTENTS

1 ST CHAPTER   ABOUT X X

2 ND CHAPTER   HOW TO USE X X

TABLE OF CONTENTS
( mokuji . doc )

FIRST CHAPTER   ABOUT X X

X X is Z Z and ...

CONFIGURATION DIAGRAM

1 ST CHAPTER
( chap 1 . doc )

FIG . 1   ( fig 1 . bmp )

SECOND CHAPTER
          HOW TO USE X X

In order to use X X , first...

2 ND CHAPTER
( chap 2 . doc )

FIG.12
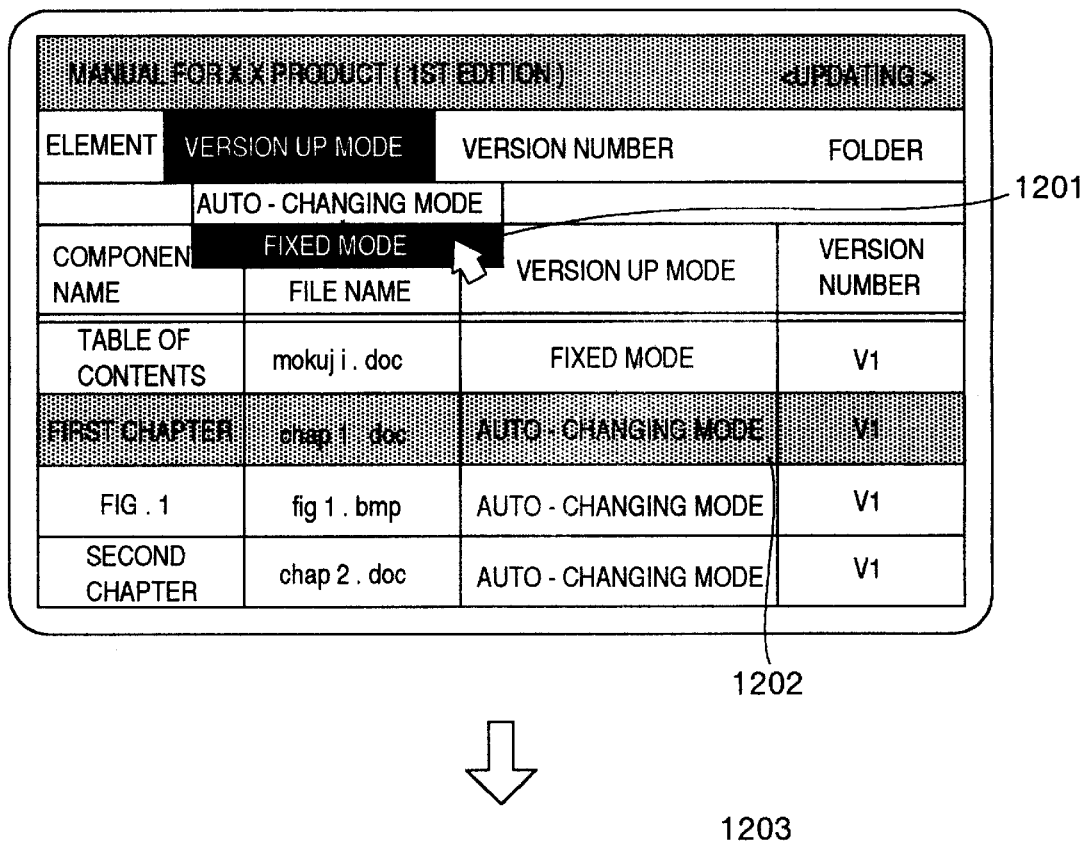
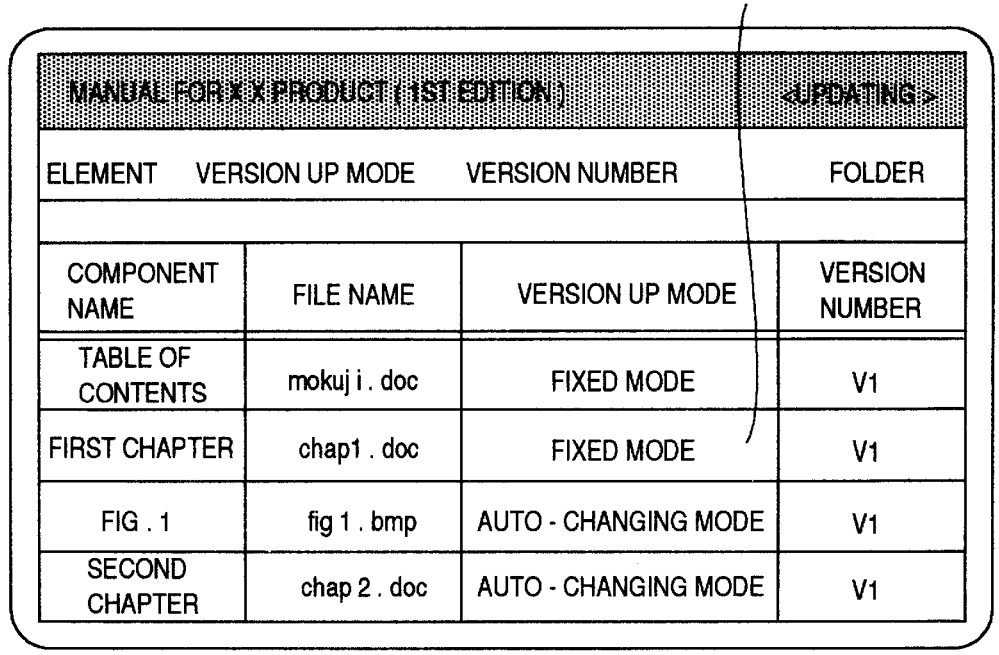

FIG.14

FIRST CHAPTER ( chap 1 . doc )

| VERSION | WRITER | PREPARATION DATE | ....... |
|---------|--------|------------------|---------|
| V1 | ICHIRO SUZUKI | 1997.12.1 16:46 | |
| V2 | ICHIRO SUZUKI | 1997.12.2 19:25 | |
| V3 | | | |
| ...... | ...... | ...... | ...... |

1401 — (pointing to V2 row)

| MANUAL FOR X X PRODUCT ( 1 ST EDITION ) | | | < UPDATING > |
|---|---|---|---|
| COMPONENT NAME | FILE NAME | VERSION UP MODE | VERSION NUMBER |
| TABLE OF CONTENTS | mokuji.doc | FIXED MODE | V1 |
| FIRST CHAPTER | chap 1.doc | AUTO - CHANGING MODE | V1 |
| FIG.1 | fig 1.bmp | AUTO - CHANGING MODE | V1 |
| SECOND CHAPTER | chap 2.doc | AUTO - CHANGING MODE | V1 |

| MANUAL FOR X X PRODUCT ( 1 ST EDITION ) | | | < UPDATING > |
|---|---|---|---|
| COMPONENT NAME | FILE NAME | VERSION UP MODE | VERSION NUMBER |
| TABLE OF CONTENTS | mokuji.doc | FIXED MODE | V1 |
| FIRST CHAPTER | chap 1.doc | AUTO - CHANGING MODE | V2 |
| FIG.1 | fig 1.bmp | AUTO - CHANGING MODE | V1 |
| SECOND CHAPTER | chap 2.doc | FIXED MODE | V2 |

| MANUAL FOR X X PRODUCT ( 1 ST EDITION ) | | | < FIXED > |
|---|---|---|---|
| COMPONENT NAME | FILE NAME | VERSION UP MODE | VERSION NUMBER |
| TABLE OF CONTENTS | mokuji . doc | FIXED MODE | V1 |
| FIRST CHAPTER | chap1 . doc | FIXED MODE | V3 |
| FIG . 1 | fig 1 . bmp | FIXED MODE | V2 |
| SECOND CHAPTER | chap2 . doc | FIXED MODE | V2 |

| MANUAL FOR X X PRODUCT (1ST EDITION) | | | < FIXED > |
|---|---|---|---|
| COMPONENT NAME | FILE NAME | VERSION UP MODE | VERSION NUMBER |
| TABLE OF CONTENTS | mokuji.doc | FIXED MODE | V1 |
| FIRST CHAPTER | chap1.doc | FIXED MODE | V3 |
| FIG.1 | fig1.bmp | FIXED MODE | V2 |
| SECOND CHAPTER | chap2.doc | FIXED MODE | V2 |

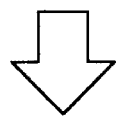
VERSION UP

2603 — 2604

| MANUAL FOR X X PRODUCT (2ND EDITION) | | | < UPDATING > |
|---|---|---|---|
| COMPONENT NAME | FILE NAME | VERSION UP MODE | VERSION NUMBER |
| TABLE OF CONTENTS | mokuji.doc | AUTO-CHANGING MODE | V2 |
| FIRST CHAPTER | chap1.doc | AUTO-CHANGING MODE | V3 |
| FIG.1 | fig1.bmp | AUTO-CHANGING MODE | V3 |
| SECOND CHAPTER | chap2.doc | AUTO-CHANGING MODE | V3 |

MANUAL FOR X X PRODUCT

| VERSION NUMBER OF FOLDER | PREPARATION DATE | STATE OF FOLDER | FIXED DATE | ...... |
|---|---|---|---|---|
| V1 | 1997.12.1 12:46 | FIXED | 1997.12.4 18:11 | ...... |
| V2 | 1997.12.5 09:25 | UPDATING | | |
| V3 | | | | |
| ...... | ...... | ...... | ...... | |

FIG.28

| MANUAL FOR X X PRODUCT ( 1 ST EDITION ) | | | < UPDATING > |
|---|---|---|---|
| ELEMENT | VERSION UP MODE | VERSION NUMBER | FOLDER |
|  |  |  | FIXED — 2801 |
| COMPONENT NAME | FILE NAME | VERSION UP MODE | UPDATING — 2802 |
|  |  |  | VER .UP — 2803 |
| TABLE OF CONTENTS | mokuj i . doc | FIXED MODE | V1 |
| FIRST CHAPTER | chap 1 . doc | AUTO - CHANGING MODE | V2 |
| FIG . 1 | fig 1 . bmp | AUTO - CHANGING MODE | V1 |
| SECOND CHAPTER | chap 2 . doc | FIXED MODE | V2 |

VERSION AND CONFIGURATION MANAGEMENT METHOD AND APPARATUS AND COMPUTER READABLE RECORDING MEDIUM FOR RECORDING THEREIN VERSION AND CONFIGURATION MANAGEMENT PROGRAM

CROSS-REFERENCE TO RELATED APPLICATION

This application relates to a U.S. application Ser. No. 09/135,645 filed Nov. 4, 1998 filed by Yuki Aoyama et al. based on Japanese Patent Application JP-09-319011 filed on Nov. 5, 1997 assigned to the present assignee. The disclosure of that application is herein incorporated by reference.

BACKGROUND OF THE INVENTION

The present invention relates to a version and configuration management system using a computer system and more particularly to a version and configuration management method and apparatus for managing versions of elements in an aggregate of elements such as a plurality of documents or the like and relation of the versions and a computer-readable recording medium in which a version and configuration management program is stored.

Development of large-scale programs and writing of documents such as manuals are often made by the group work by a plurality of persons rather than by an individual. In such a group work, it is necessary to do the work in cooperation while the persons in charge communicate with one another and manage their respective working circumstances in addition to management of versions of documents.

To this end, a document management system used in the group work essentially requires the version management function and the configuration management function.

The version management function is to manage information such as version numbers and preparation dates of documents and restore any past versions so that any versions are preserved and taken out easily when the user edits and preserves documents. For example, when a latest version is erased by mistake or when it is desired that a document at the time of three days ago is restored, the version management function is required.

An aggregate of a series of related elements such as files or objects in which documents or source programs are stored is named a project. The elements may be components in documents and programs. The configuration management function is to manage related elements constituting a project. Further, the configuration management function also has the function of not only managing relation between a plurality of elements but also managing relation between versions set to individual elements and preserving the project at any past time.

The above-mentioned problems are definitely considered with reference to an example where a large-scale manual is written in cooperation.

It is assumed that writers are determined for respective chapters and the writers start writing at their own writing pace. At this time, there often occur circumstances where "the manual of this version is once preserved and continuously a manual of a new version must be written" or "a document is erased by mistake during the writing work, while the manual of a previous version must be submitted in haste regardless of the previous version". In order to preserve a project at any past time, it is necessary to manage elements constituting the project and also manage versions of the elements at the past time. To this end, not only the version management function but also the configuration management function is requisite.

If the version is not managed, a document is overwritten each time the document is edited and preserved, so that only the document of a latest version is left. Accordingly, documents erased by mistake or documents at a past time cannot be restored.

Thus, a method of managing the versions by hand, for example, by giving names to individual versions by the user himself has been performed, while this method takes time and management of information pertaining to relation between documents and modification of documents as compared with previous versions must be all made by hand. Accordingly, the management is extremely complicated and actually impossible.

Further, when the configuration is not managed, a plurality of elements cannot be related to one another and accordingly it cannot be understood which versions of which elements have relation therebetween. Accordingly, a method in which versions to which a plurality of elements are related are arranged to be registered collectively in a project to manage the configuration has been also performed, while in this method the user must manage versions of individual elements when the versions are registered in the project and accordingly this method takes much time.

In order to manage the project which is an aggregate of related elements such as files or objects without any burden of management on the user, the version management function and the configuration management function are requisite.

A conventional version management system aiming at realization of such functions attains the following functions.

This system can manage versions of elements such as files or objects, so that versions of respective elements at any time can be taken out and information as to how versions are changed as compared with previous versions can be managed. Furthermore, elements such as a plurality of files or objects are registered in one project, so that the elements can be managed as a related aggregate.

FIG. 5 illustrates the above system definitely.

Elements such as "a table of contents", "the first chapter", "FIG. 1" and "the second chapter" can be registered to be managed as a related aggregate into one project of "manual for xx product (1st edition)". Further, update of version that each element is updated from the version 1 to the versions 2, 3 (hereinafter described as V1, V2, . . . ) can be automatically managed and it is possible to refer to a latest version of each element at any time from a configuration management folder.

For example, the element named "the first chapter" is updated from V1 to V2, V3, and V3 is now a latest version. That is, the version of "the first chapter" registered in "manual for xx product (1st edition)" is V3.

SUMMARY OF THE INVENTION

The above-mentioned prior art can collectively arrange to manage related elements such as files or objects and can automatically manage versions of respective elements registered, although the following points are not taken into consideration.

(1) Not only the relation between elements constituting a project but also the relation between any versions of the elements is also managed, while the project constituted by elements of any versions cannot be managed.

In order to preserve the project at any past time, not only the relation between elements constituting the project but also the relation between any versions of elements must be managed.

In the conventional version management system, however, as shown in FIG. 5, only the relation between elements registered in the project is managed and the project is always constituted by latest versions of respective elements. Accordingly, the project constituted by any past versions of elements cannot be preserved.

(2) An element such as one file or object cannot be shared among a plurality of different projects.

For example, there is a case where in order to prepare a "specification for functions of xx product", a "product configuration diagram" which is the same as one used in the "manual for xx product" is desired to be used.

When one element cannot be shared among different projects, there is a method where the "product configuration diagram" used in the "manual for xx product" is copied and the copy is used for the "specification for functions of xx product".

In this method, however, when the "product configuration diagram" is desired to be changed, the respective "product configuration diagrams" registered in both the projects of the "manual for xx product" and the "specification for functions of xx product" must be changed together. Accordingly, it takes time and an error tends to occur. Further, it is difficult to take matching.

(3) The version of the project itself cannot be updated.

For example, when a new edition of a manual is prepared, there often occurs a case where the aggregate of versions for a first edition of the manual is preserved as it is and a second edition of the manual is desired to be prepared.

When the versions are managed by hand, a project for a "manual for xx product (2nd edition)" is prepared separately from the project for the "manual for xx product (1st edition)" and versions of necessary elements are copied from the project for the "manual for xx product (1st edition)" and are registered in the project for the "manual for xx product (2nd edition)".

However, it is very inefficient and troublesome to register the same elements as those of the project for the "manual for xx product (1st edition)" into the project for the "manual for xx product (2nd edition)" purposely when the project having similar contents is prepared as preparation of the new edition of the manual.

Further, when two independent projects are prepared, the relation between the projects cannot be managed as shown in FIG. 6 and the relation between registered elements and the relation between versions of the elements are disconnected.

FIG. 6 illustrates an example where the project for the "manual for xx product (2nd edition)" is newly prepared on the basis of the project for the "manual for xx product (1st edition)". Two components such as "first chapter" and "second chapter" are registered in the two projects. Further, with the element of the "second chapter", for example, the versions of V1, V2 and V3 for the "second chapter" registered in the project for the "manual for xx product (1st edition)" and V1 and V2 for the "second chapter" registered in the project for the "manual for xx product (2nd edition)" are versions prepared in series.

More particularly, the version of the element should be updated from V1 through V2, V3 and V4 to V5 essentially, while since the versions V1, V2 and V3 and the versions V4 and V5 are registered in different projects, respectively, the relation between the versions is severed. Accordingly, even when it is desired to trace past versions for the "second chapter" registered in the project for the "manual for xx product (2nd edition)", for example, only one version updated just before the latest version V2 is obtained and the past versions cannot be traced to the original version V1, that is, the version V1 registered in the project for the "manual for xx product (1st version)".

In the case of the conventional version management system, as shown in FIG. 5, the elements can be registered and the relation between the elements can be managed, although the latest versions are registered for all the elements. It is impossible to register and manage any version of each of the elements, that is, it is impossible to manage the relation between the versions of the components.

It is an object of the present invention to solve the problems in the prior art as described above and attain the following.

(1) In any configuration management folder having a meaning as an aggregate of files or objects representing documents, program sources or the like and further as an aggregate of components or elements such as data desired to be managed, not only the relation between a plurality of related components but also the relation between any versions set to a plurality of components can be managed to thereby preserve the configuration management folder constituted by components of any version.

(2) The component such as one file or object can be shared between a plurality of different configuration management folders.

(3) The version of the configuration management folder itself can be updated.

In order to solve the above problems, according to the present invention, a version and-configuration management method in a project management system including a processing unit, a memory unit and a terminal unit and for managing a project including a plurality of components, comprises:

registering information including names of components to be managed to the product, names of files in which the components are stored, version numbers of the components and version up modes representing auto-changing modes in which versions of the components are automatically updated and fixed modes in which the versions of the components are not updated into a configuration information management table with version up mode or updating the information in the table and preserving the table in the memory unit;

updating, when a component of the project is edited, a version number of the edited component of the project to be preserved in the memory unit and updating a version information management table corresponding to the edited component of the project to be preserved in the memory; and judging whether a component corresponding to the edited component of the project is present in the configuration information management table preserved in the memory unit or not and when the corresponding component is present, judging a version up mode of the corresponding component in the configuration information management table so that when the judged result is the auto-changing mode, a version number of the corresponding component is changed to the updated version number and when the judged result is the fixed mode, the version number of the corresponding component is not changed.

Further, when the component of the project is edited, it is judged whether a component corresponding to the edited component of the project is present in the configuration information management table or not before the version number of the edited component is updated to be preserved in the memory unit and when the corresponding component is present, a version up mode of the corresponding component in the table is judged so that when the judged result is the auto-changing mode, an indication for causing a user to select any preservation method of "preservation" or "version is fixed and preserved" is made so that the user can select the preservation method.

Furthermore, a configuration management folder version information management table for managing versions of a configuration management folder composed of the configuration information management table of the project having the information registered or updated and a name of the project is prepared for each of the folder and when a new version of the configuration management folder is prepared, configuration management folder version information including a version number, a preparation date, a folder state indicative of fixed state or updating state and a fixed date of the new version is registered in the configuration management folder version information management table, which is preserved in the memory unit. the configuration management folder version information management table preserved in the memory unit is updated when information for changing the configuration management folder version information is inputted.

BRIEF DESCRIPTION OF THE DRAWINGS

FIG. 12 is a diagram representing a graphical user interface (GUI) for registering configuration information according to the present invention;

FIG. 14 is a diagram showing a version information management table according to the present invention;

FIG. 26 is a diagram for explaining version up of a configuration management folder in the third embodiment according to the present invention;

FIG. 27 is a diagram showing a version information management table of a configuration management folder in the third embodiment according to the present invention; and FIG. 28 is a diagram showing a graphical user interface (GUI) for version up of a configuration management folder in the third embodiment according to the present invention.

DETAILED DESCRIPTION OF THE PREFERRED EMBODIMENTS

A first embodiment of the present invention is now described with reference to the accompanying drawings.

Further, as described above, an aggregate of a series of related elements such as files or objects in which documents, program sources or the like are stored is named a project. In the following description, manuals, functional specifications and the like are projects. In addition, compositions, drawings and the like are components of a project.

Figure 1:
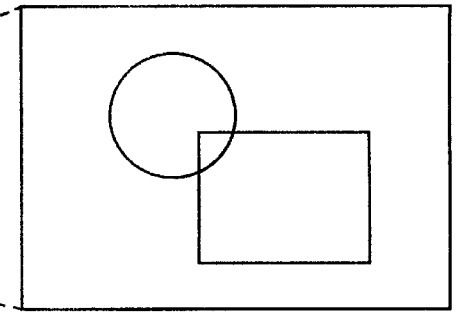
FIG. 1 is a schematic diagram illustrating a first embodiment according to the present invention.

First, FIG. 1 schematically illustrates the embodiment.

As shown in FIG. 1, the first embodiment includes a terminal unit 101, a CPU 102, a medium 103 such as a floppy disk for distributing documents or the like, a BUS 104, a primary memory unit 105, secondary memory units 106a, 106b, 106c and 106d.

Further, a registration and modification program 107, a reference program 108 and an editing program 109 are read out from the secondary memory unit 106d if necessary and are stored in the primary memory unit 105 to be executed by the CPU 102.

The registration and modification program 107 for performing configuration information registration and modification processing includes a component name registration and modification program 110, a version up mode setting program 111, a version number setting program 112 and a configuration information preservation program 113.

The reference program 108 includes a configuration information acquisition program 114, a document acquisition program 115 and a document display program 116.

The editing program 109 includes a document editing program 117, a new version preservation program 118, a version information preservation program 119 and a version up mode judgment program 120.

Documents for respective versions are stored in the secondary memory unit 106a, a configuration information management table 121 with version up mode in the secondary memory unit 106b, a version information management table 122 in the secondary memory unit 106c, and document management programs in the secondary memory unit 106d.

A configuration information registration and modification processing procedure in the embodiment is now described.

Figure 2:
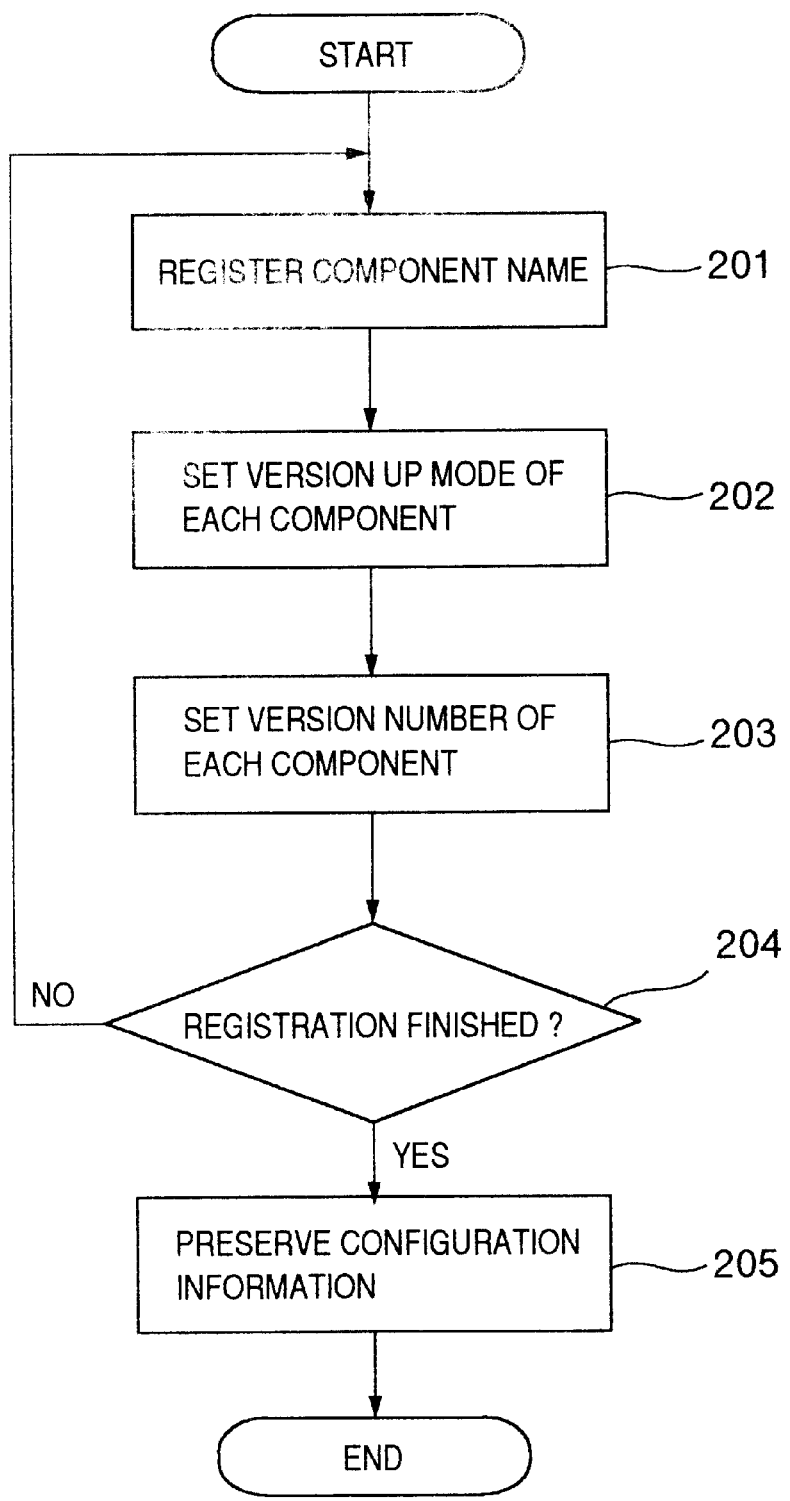
FIG. 2 is a flow chart showing a configuration information registration and modification processing procedure in the first embodiment according to the present invention.

FIG. 2 is a flow chart showing the configuration information registration and modification processing procedure performed by the registration and modification program 107 of the embodiment.

Figure 10:
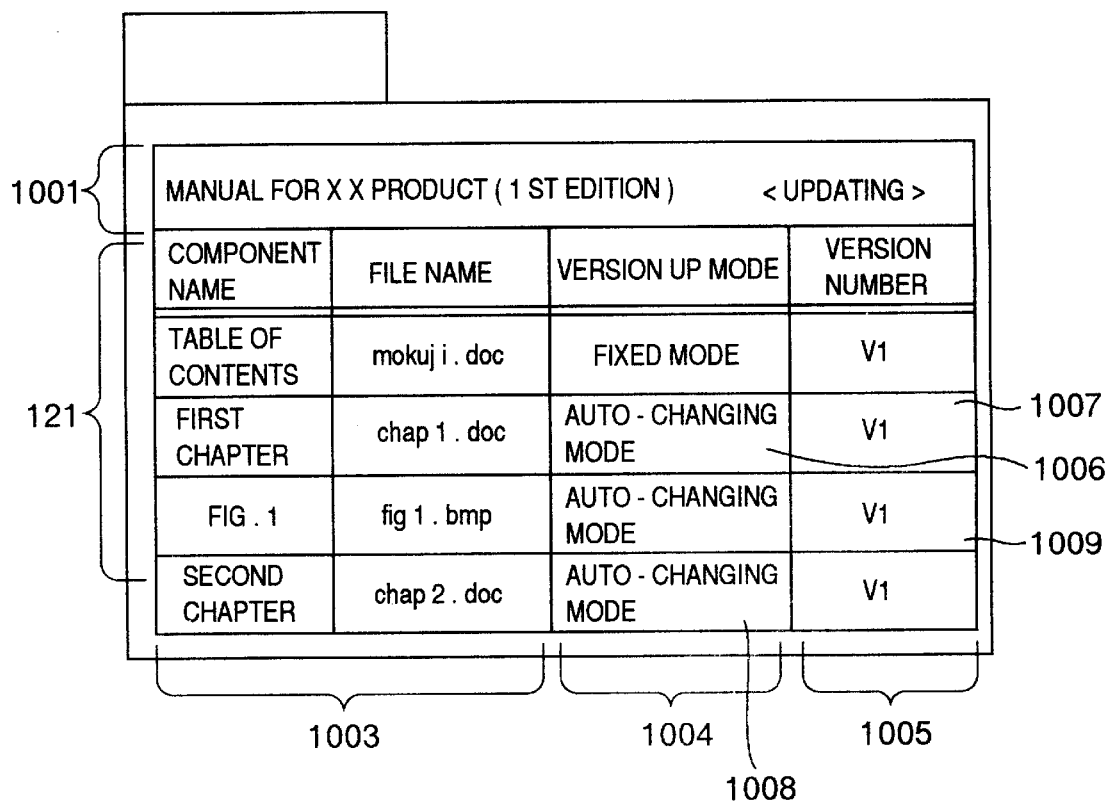
FIG. 10 is a diagram showing a configuration of a configuration management folder according to the present invention.

First, referring to FIG. 10, a configuration management folder includes a configuration management folder name 1001 and a configuration information management table 121 with version up mode. The format of the configuration management folder is previously prepared and stored in the secondary memory unit 106b.

When components such as documents which the user wants to arrange and manage collectively as a related aggregate are registered in the configuration management folder or when the components are modified or changed, the component name registration and modification program 110 is first executed at step 201 in which a document name (component name) of a document to be managed designated by the user and a name of a file in which the document is stored are registered in the configuration information management table 121 with version up mode.

At next step 202, the version up mode setting program 111 is executed, so that a version up mode of each component in the configuration information management table 121 with version up mode is set to an "auto-changing mode" or a "fixed mode" in accordance with user's selection inputted from the terminal unit 101.

At next step 203, the version number setting program 112 is executed, so that version numbers of the components in the configuration information management table 121 with version up mode are set to the version numbers designated by the user.

At step 204, whether the user finishes the registration and modification of the components or not is designated from the terminal unit 101. When registration of a new component or modification of the component name, the version up mode and the version name of the component is designated, the process is returned to step 201.

After the registration or modification by the user of the configuration information to the configuration management folder has been completed in the above steps, the configuration information preservation program 113 is executed at step 205, so that the configuration information described in the configuration information management table 121 with version up mode is preserved in the secondary memory unit 106b.

A document reference processing procedure in the embodiment is now described.

Figure 3:
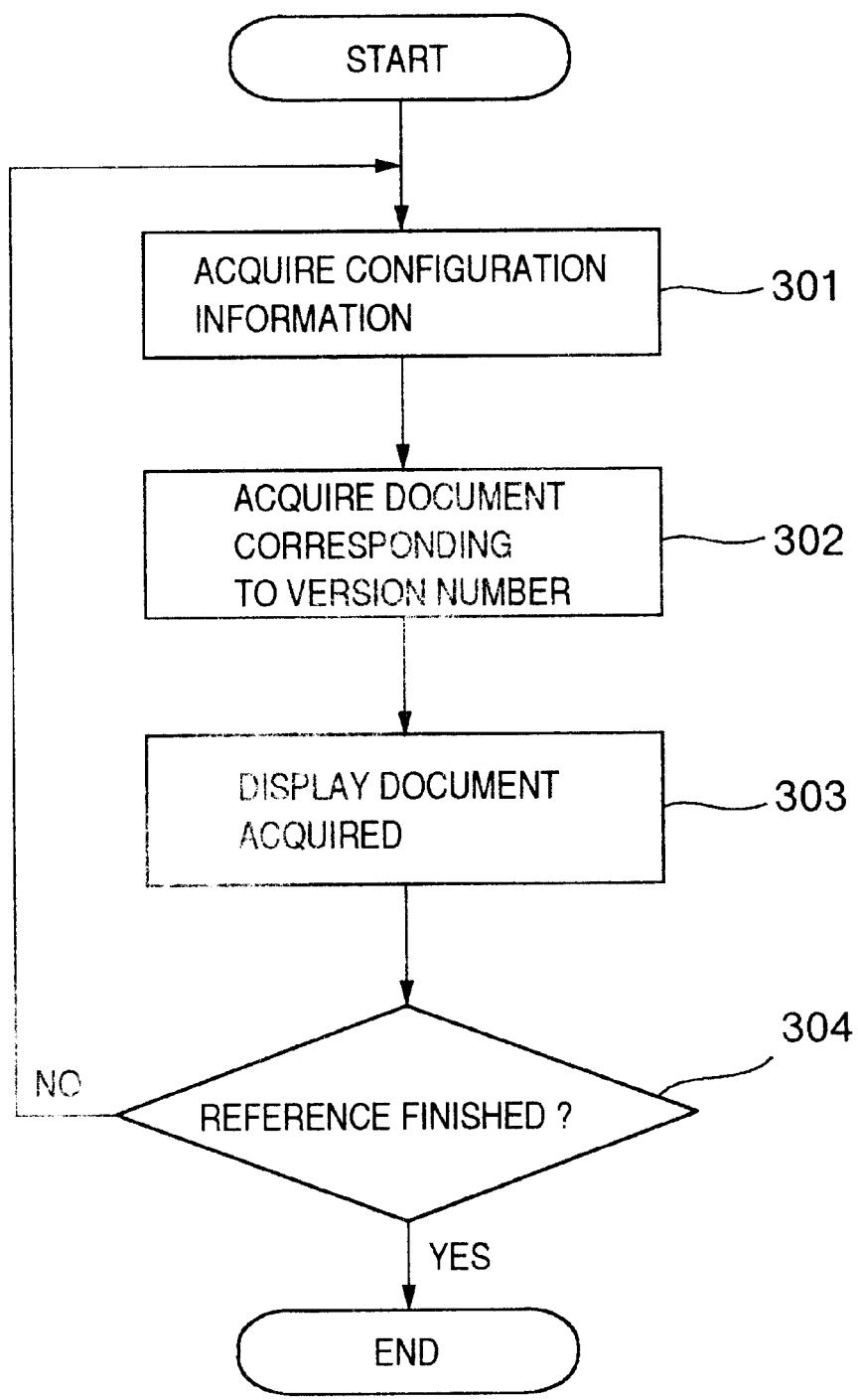
FIG. 3 is a flow chart showing a document reference processing procedure in the first embodiment according to the present invention.

FIG. 3 is a flow chart showing the document reference processing procedure performed by the reference program 108 in the embodiment.

When the user edits a document, at first step 301, the configuration information acquisition program 114 is executed to acquire the configuration information such as the component name, the file name, the version up mode, the version number and the like described in the configuration information management table 121 with version up mode.

At next step 302, the document acquisition program 115 is executed to acquire the document corresponding to the version number of each component represented by the configuration information acquired at step 301 from the secondary memory unit 106a.

At step 303, the document display program 116 is executed to display the document acquired at step 302.

Finally, at step 304, whether the user finishes the reference or not is judged. When the reference is designated successively, the process is returned to step 301.

As described above, the document can be acquired on the basis of the configuration information registered in the configuration information management table 121 with version up mode by the user.

A document editing processing procedure in the embodiment is now described.

Figure 4:
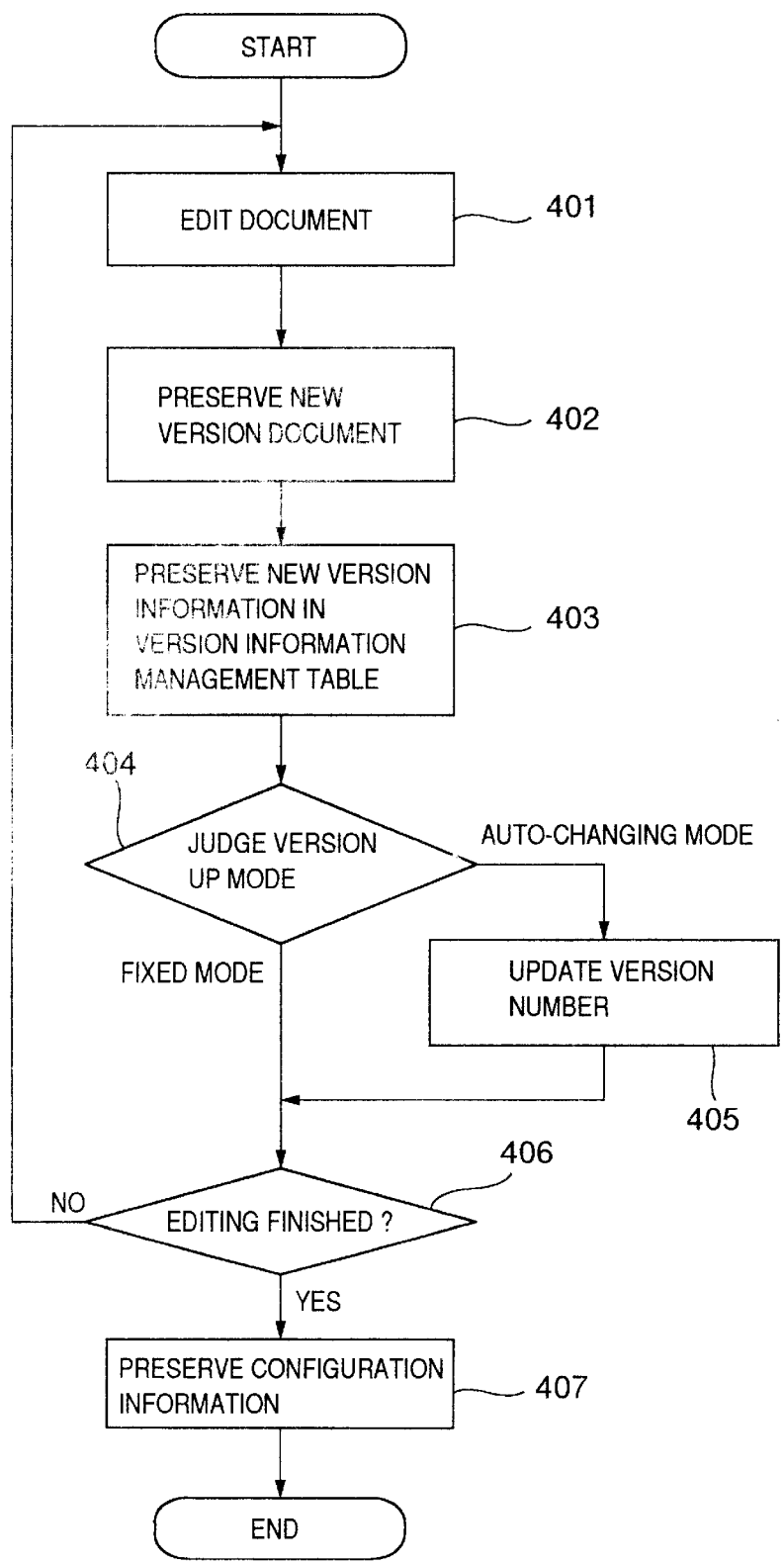
FIG. 4 is a flow chart showing a document editing processing procedure in the first embodiment according to the present invention.
Figure 5:
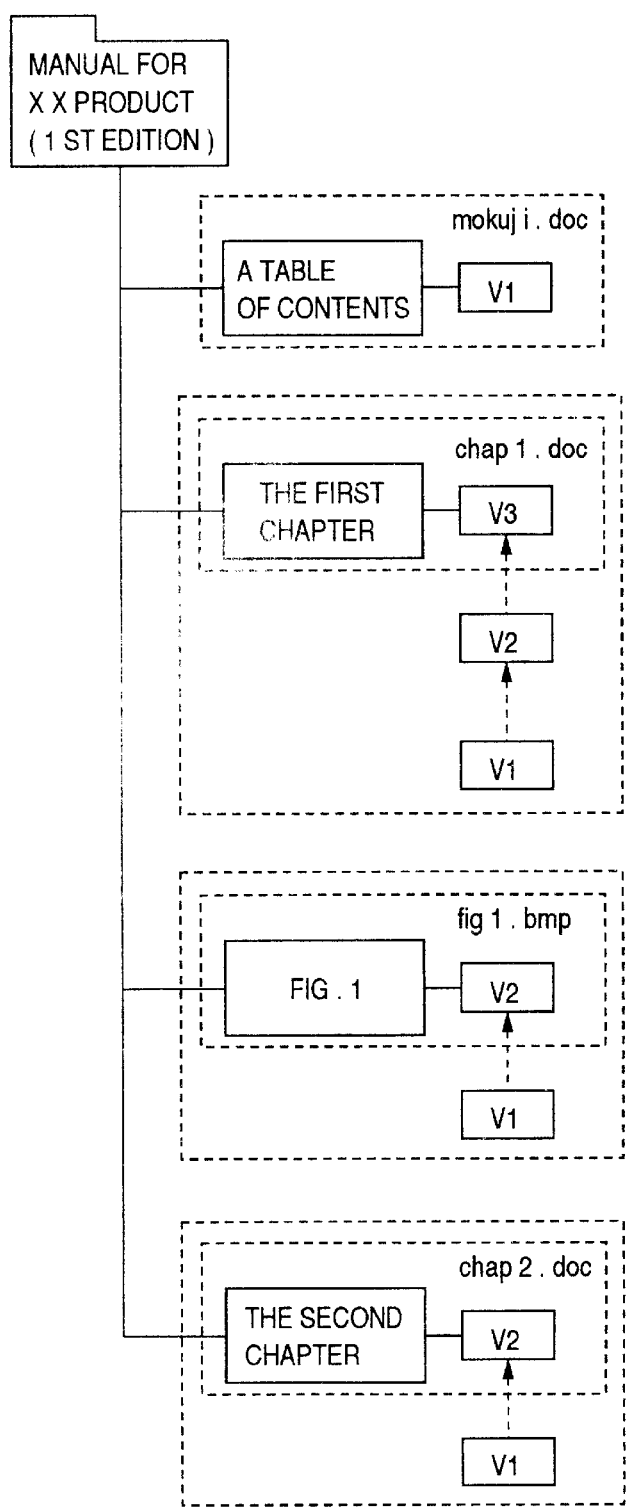
FIG. 5 is a diagram for explaining configuration management in a prior art.
Figure 6:
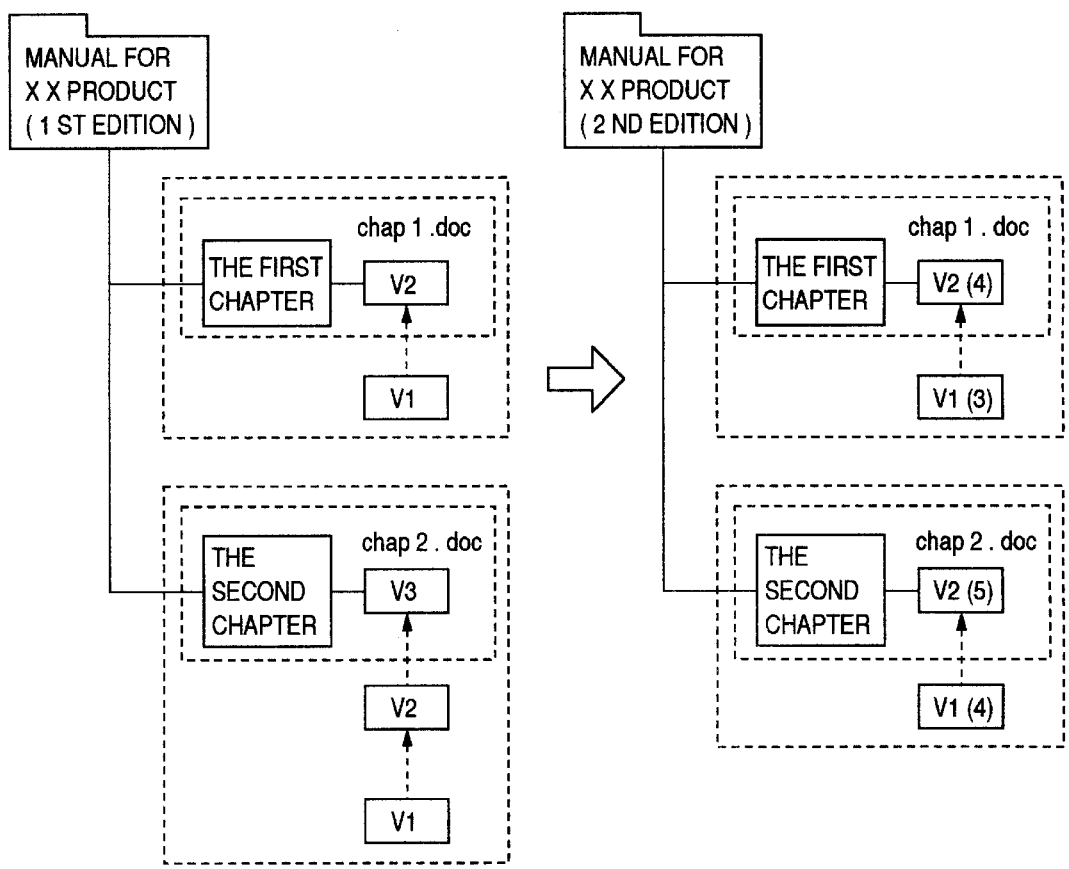
FIG. 6 is a diagram for explaining preparation of a now project in a prior art.

FIG. 4 is a flow chart showing the document editing processing procedure performed by the editing program 109 in the embodiment.

When the user edits a document, the document editing program 117 is first executed at step 401, so that the user edits the document acquired at step 302.

At step 402, when the user designates preservation of the document edited by the user, the new version preservation program 118 is executed, so that the edited document is preserved in the secondary memory unit 106a as a new version document with reference to the version information management table 122 in which version numbers, writers or drafters, preparation dates and the like of versions are recorded.

At next step 403, the version information preservation program 119 is executed, so that the version information such as the version number, the writer or drafter, the preparation date and the like of the new version preserved in the secondary memory unit 106a at step 402 is recorded in the version information management table 122 and preserved in the secondary memory unit 106c.

As described above, each time the user edits and preserves the document, a new version is prepared and version information is recorded. Accordingly, there is no necessity that the user manages the versions of documents one by one, and extremely effective version management can be attained.

At next step 404, the version up mode judgment program 120 is executed, so that the version up mode of the edited component is judged with reference to the configuration information management table 121 with version up mode.

At step 404, when the version up mode of the edited component is judged to be the "auto-changing mode", the version number setting program 112 is executed at step 405 to update the version number.

On the other hand, at step 404, when the version up mode of the edited component is judged to be the "fixed mode", the version number is not updated and the process proceeds to step 406.

At next step 406, whether the user finishes the editing of the document or not is judged. When editing is designated successively, the process is returned to step 401.

After the user has finished the editing in the above steps, the configuration information preservation program 113 is executed at step 407, so that the configuration information described in the configuration information management table 121 with version up mode is preserved in the secondary memory unit 106*b*.

The configuration management folder stores pointer information to the version stored in the secondary memory unit into the configuration information management table with version up mode in accordance with the version numbers of the components. The pointer information corresponds to the file name and the version number in FIG. 10. Two states including the "auto-changing mode" and the "fixed mode" are stored in accordance with the pointer as the version up mode.

The version update processing of a document in the above two modes, that is, the "auto-changing mode" and the "fixed mode" is now described in brief.

When the user sets the version up mode of a certain component to the "auto-changing mode", the version number which is a pointer to the component is changed to a new version number and at the same time the version number in the configuration information management table with version up mode is also updated each time the user performs editing and preservation of the component so that a new version is prepared.

Figure 7:
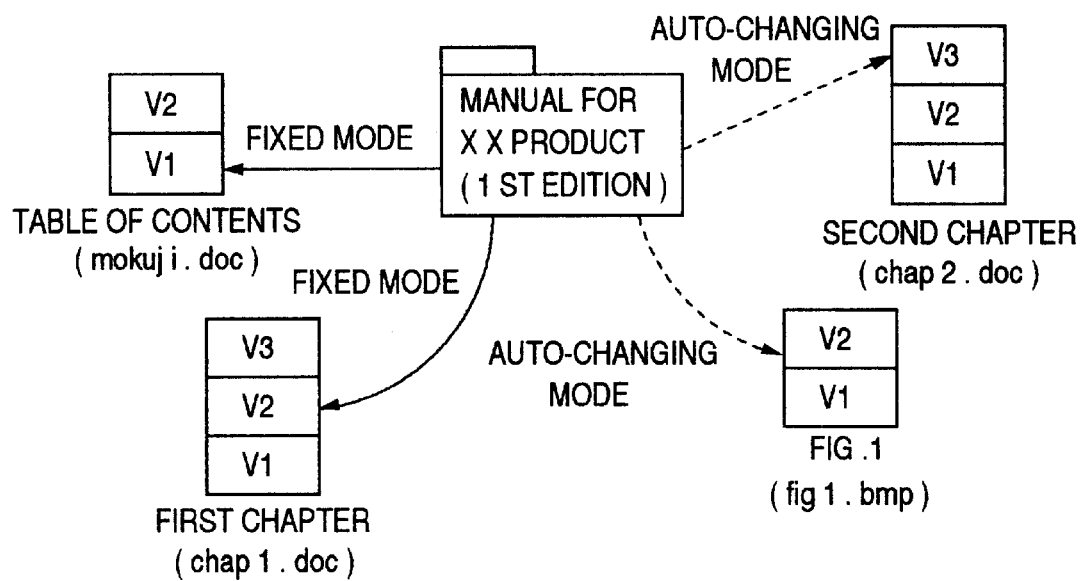
FIG. 7 is a diagram for explaining configuration management according to the present invention.

In an example shown in FIG. 7, when the version V2 of the "second chapter" is edited and preserved so that a version V3 is prepared, the pointer from the configuration management folder to the "second chapter" is changed from V2 to V3 as shown by dotted line.

On the other hand, when the user sets the version up mode of a certain component to the "fixed mode", the pointer to the component is left to the state pointing to the version designated by the user and even when the user performs editing and preservation of the component so that a new version is prepared, the pointer to the component is not updated. Consequently, since the version number is not also updated, the version designated by the user is left registered in the configuration management folder.

In the example shown in FIG. 7, even when the version V2 of the "first chapter" is edited and preserved so that the version V3 is prepared, the pointer from the configuration management folder to the "first chapter" is not changed and is left pointing to the version V2 as shown by solid line.

More particularly, when the user sets the version up mode of a component to the "auto-changing mode", a registered version is updated to a new version each time he user performs editing and preservation of the component so that the new version is prepared. Accordingly, the latest version can be always obtained even if the user does not perform complicated management of versions one by one.

On the other hand, when the user sets the version up mode of a certain component to the "fixed mode", a registered version is not updated as it is even when editing and preservation of the component are performed so that a new version is prepared. Accordingly, editing can be performed successively while the version at any past time is registered.

As described above, since the user can leave any version of the components registered in the configuration management folder, not only the relation between components but also the relation between any version of components can be managed.

Further, as described above, since the configuration management folder holds the pointer information to the component instead of the substance of the component in the configuration information management table with version up mode, one document can be shared between a plurality of different configuration management folders. Moreover, different versions for the same component can be registered in a plurality of different configuration management folders.

Figure 8:
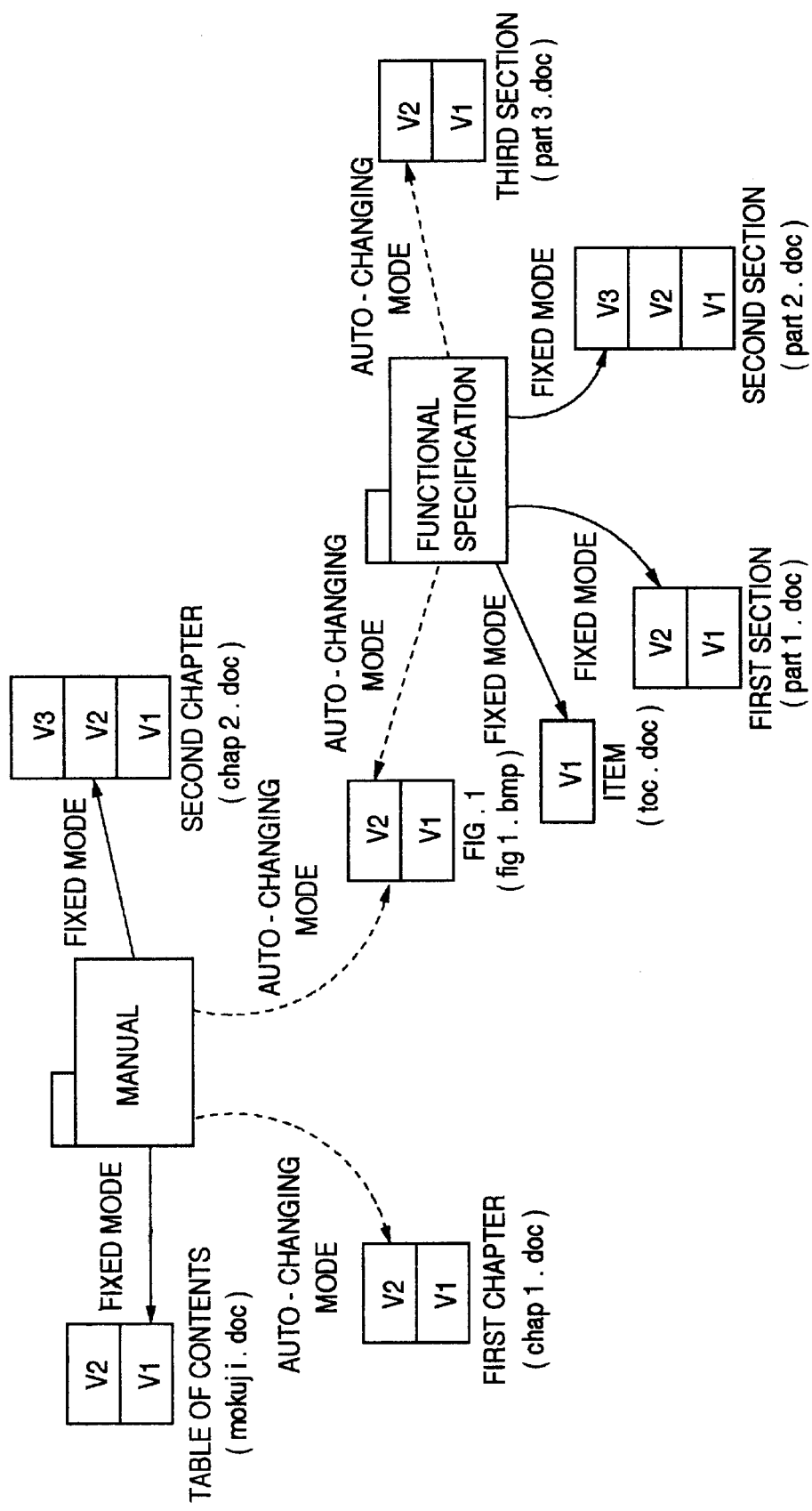
FIG. 8 is a diagram for explaining sharing of components between the configuration management folders according to the present invention.

In an example shown in FIG. 8, "FIG. 1 (fig.bmp)" is shared between different configuration management folders of "manual" and "functional specification" as shown by dotted lines.

In this manner, with the possibility of sharing one file between different configuration management folders, when the "FIG. 1 (fig.bmp) is changed or modified, the modification is reflected to the "FIG. 1 (fig.bmp)" registered in each of the "manual" and the "functional specification". Consequently, it is not necessary to modify a plurality of identical documents and it is possible to solve the problem of mismatching that one document is modified but another document is left unmodified.

A definite processing example of the embodiment is now described with reference to a document example shown in FIG. 11.

Figure 11:
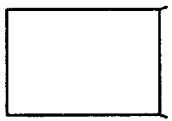
FIG. 11 is a diagram showing an example of a document which is subjected to configuration management.

As shown in FIG. 11, the "manual for xx product (1st edition)" includes "table of contents (mokuji.doc)", "first chapter (chap1.doc)", "FIG. 1 (fig1.bmp)" and "second chapter (chap2.doc)".

First, a definite example of the configuration information registration and modification processing in the embodiment is described.

First, at step 201 (FIG.2), four components of the "table of contents (mokuji.doc)", the "first chapter (chap1.doc)", the "FIG. 1 (fig1.bmp)" and the "second chapter (chap2.doc)" a are registered in the configuration information management table 121 with version up mode in the configuration management folder named the "manual for xx product (1st edition)" a as shown by 1003 of FIG. 10.

Then, at step 202 (FIG.2), the version up modes of the components are set to the "auto-changing mode" or the "fixed mode" in accordance with the user's selection of the version up mode of the components. In this example, as shown by 1004 of FIG.10, the version up mode of the "table of contents" is set to the fixed mode and the version up modes of the "first chapter", the "FIG. 1" and the "second chapter" are set to the auto-changing mode.

At next step 203 (FIG. 2), the version number of the components are set to version numbers designated by the user. In this example, as shown by 1005 of FIG. 10, all of the four components are set to V1.

At step 204 (FIG. 2), the user designates whether the registration of the components is finished or not. When the registration of a new component or modification of a component is designated, the process is returned to step 201.

After the user has finished the registration or the modification of the configuration information in the above steps, the configuration information (FIG. 10) is preserved in the secondary memory unit 106*b* at step 205 (FIG. 2).

The foregoing is the definite example of the registration processing of the configuration information, while even when the configuration information such as the component name, the version up mode or the version number is modified, the registration and modification program 107 is used.

FIG. 12 shows a user operated picture (GUI) in the registration and modification processing of the configuration information.

The case where the version up mode of the "first chapter" is modified from the auto-changing mode to the fixed mode is now described by way of example.

As shown in FIG. 12, the user selects the component "first chapter" of which the version up mode is to be modified by means of a mouse. Then, the user selects the fixed mode shown by 1201 from a menu bar of the version up mode displayed as the result of the selection.

Then, the version up mode setting program 111 is executed so that the version up mode of the component "first chapter" is changed to from the auto-changing mode (1202) to the fixed mode (1203). On the other hand, change from the fixed mode to the auto-changing mode is also made similarly.

A definite example of the document editing processing in the embodiment is now described.

It is assumed that the components as shown in FIG. 10 are registered in the configuration management folder "manual for xx product (1st edition)" by the registration and modification processing of the configuration information as described above.

When the user edits a document, the document acquired at step 302 (FIG. 3) is first edited at step 401 (FIG. 4). In this example, it is assumed that the "first chapter" has been edited.

At step 402 (FIG. 4), when the user designates preservation of the document edited at step 401, the edited document is preserved in the secondary memory unit 106a as a new version with reference to the version information management table 122.

In this example, when the user edits the version V1 of the "first chapter" and preserves it, the version V2 of the "first chapter" is preserved in the secondary memory unit 106a as the new version.

At next step 403 (FIG. 4), the version information of the new version preserved in the secondary memory unit 106a is recorded in the version information management table 122. In this example, as shown in FIG. 14, V2 of the "first chapter" is preserved as the version information 1401.

Next, at step 404 (FIG. 4), the version up mode of the edited component is judged.

It is understood that the version up mode of the "first chapter" is the auto-changing mode as shown by 1006 (FIG. 10).

At step 404 (FIG. 4), since it is judged that the version up mode of the "first chapter" is the auto-changing mode as shown by 1006 (FIG. 10), the version number setting program 112 is executed at step 405 so that the version number 1007 of the edited document "first chapter" registered in the configuration management information table 121 with version up mode is changed from V1 to V2.

At next step 406 (FIG. 4), whether the user finishes the editing of the document or not is judged. When editing is designated successively, the process is returned to step 401.

After the user has finished the editing in the above steps, the configuration information preservation program 113 is executed at step 407 so that the configuration information described in the configuration information management table 121 with version up mode is preserved in the secondary memory unit 106b.

The foregoing is the definite example of the document editing processing.

How the configuration management folder of FIG. 10 is changed with the editing processing of document is now described in order.

Figure 13:
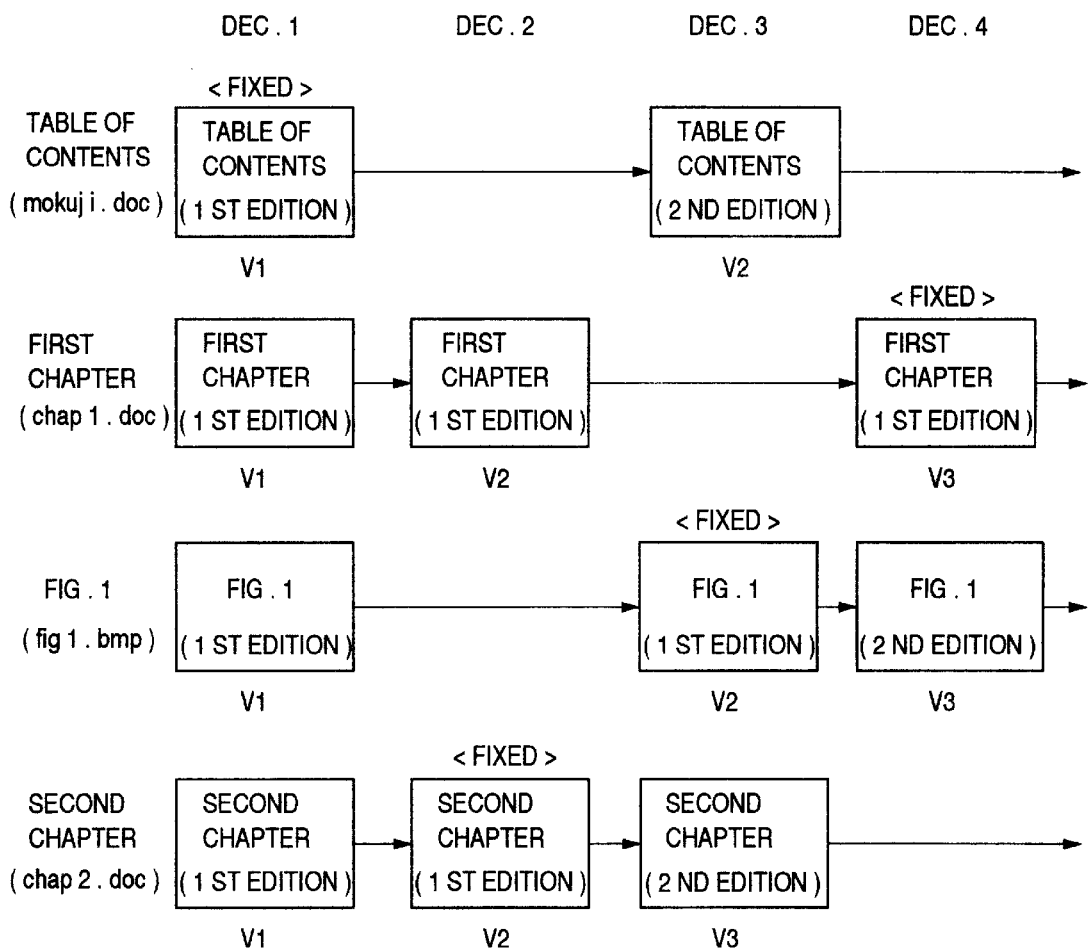
FIG. 13 is a diagram representing an editing process of a document desired to be subjected to configuration management.

FIG. 13 shows an example of the editing process of the document example "manual for xx product (1st edition)" shown in FIG. 11. FIG. 13 shows how the components "table of contents", "first chapter", "FIG. 1 and "second chapter" are edited from day to day to update the versions. In FIG. 13, the unit for editing is one day, while the unit for editing can be set more minutely.

First, the editing process is described definitely with regard to the "FIG. 1 (fig1.bmp)" in the manual.

At the time of December 1st, the version up mode and the version number of the "FIG. 1 (fig1.bmp)" registered in the configuration management folder "manual of xx product (1st edition)" are set to the auto-changing mode and V1, respectively.

On December 2nd, the "FIG. 1 (fig1.bmp) is not edited and the version V1 is left registered in the configuration management folder.

On December 3rd, the person in charge edits the "FIG. 1 (fig1.bmp)" to thereby prepare the version V2 of the "FIG. 1 (fig1.bmp)".

Since the version up mode of the "FIG. 1 (fig1.bmp)" is the auto-changing mode, the version number of the configuration management folder is updated to V2. The writer who judges that the "FIG. 1 (fig1.bmp)" for the "manual for xx product (1st edition)" has been completed sets the version V2 to the fixed mode.

On December 4th, since the person in charge of the "FIG. 1 (fig1.bmp)" further edits the "FIG. 1 (fig1.bmp)" in order to use it to the "manual for xx product (2nd edition)", a version V3 of the "FIG. 1 (fig1.bmp)" is prepared. However, since the version up mode of the "FIG. 1 (fig1.bmp)" is the fixed mode, the version thereof registered in the configuration management folder "manual for xx product (1st edition)" is left as it is V2.

Components other than the "FIG. 1 (fig1.bmp)" are also edited similarly so that the components trace the update history as shown in FIG. 13.

The document editing processing procedure is now described definitely in detail with reference to the update example of the components shown in FIG. 13.

Figure 15:
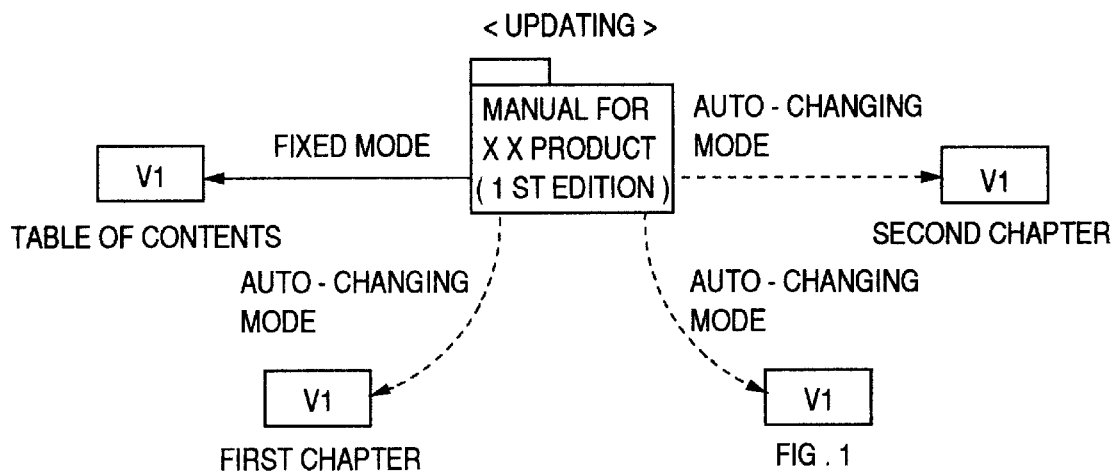
FIG. 15 is a diagram representing a state of a configuration management folder in the document editing process according to the present invention.

First of all, at the time of December 1st, it is assumed that the components are registered in the configuration management folder "manual for xx product (1st edition)" as shown in FIG. 15 by the configuration information registration and modification step. That is, the configuration management folder "manual for xx product (1st edition)" includes the "table of contents (mokuji.doc)" (fixed mode, V1), the "first chapter (chap1.doc)" (auto-changing mode, V1), the "FIG. 1 (fig1.bmp)" (auto-changing mode, V1), and the "second chapter (chap2.doc)" (auto-changing mode, V1).

On December 2nd, as the editing example shown in FIG. 13, the "first chapter (chap1.doc)" and the "second chapter (chap2.doc)" are edited and further the version up mode of the "second chapter (chap2. doc)" is set to the fixed mode.

Figure 16:
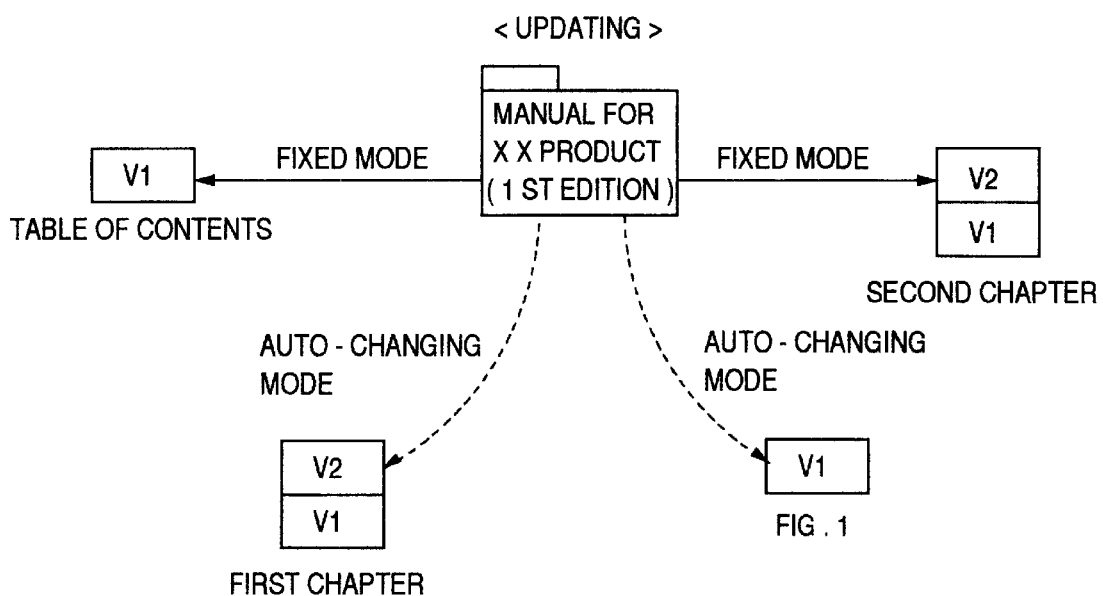
FIG. 16 is a diagram representing a state of a configuration management folder in the document editing process according to the present invention.

Consequently, the configuration management folder "manual for xx product (1st edition)" is changed as shown in FIG. 16. That is, the "first chapter (chap1.doc)" set in the auto-changing mode is updated to V2 and the "second chapter (chap2.doc)" is also updated to V2. At the same time, the "second chapter (chap2.doc)" is changed to the fixed mode.

On December 3rd, as the editing example shown in FIG. 13, the "table of contents (mokuji.doc)", the "FIG. 1 (fig1.bmp)" and the "second chapter (chap2.doc)" are edited and the version up mode of the "FIG. 1 (fig1.bmp) is set to the fixed mode. At this time, the "second chapter (chap2.doc)" of V3 which is a new version thereof is prepared, while since the version up mode of the "second chapter (chap2.doc)" is the fixed mode, the version thereof is not updated and the version V2 of the "second chapter (chap2.doc)" is the component instead of V3.

Figure 17:
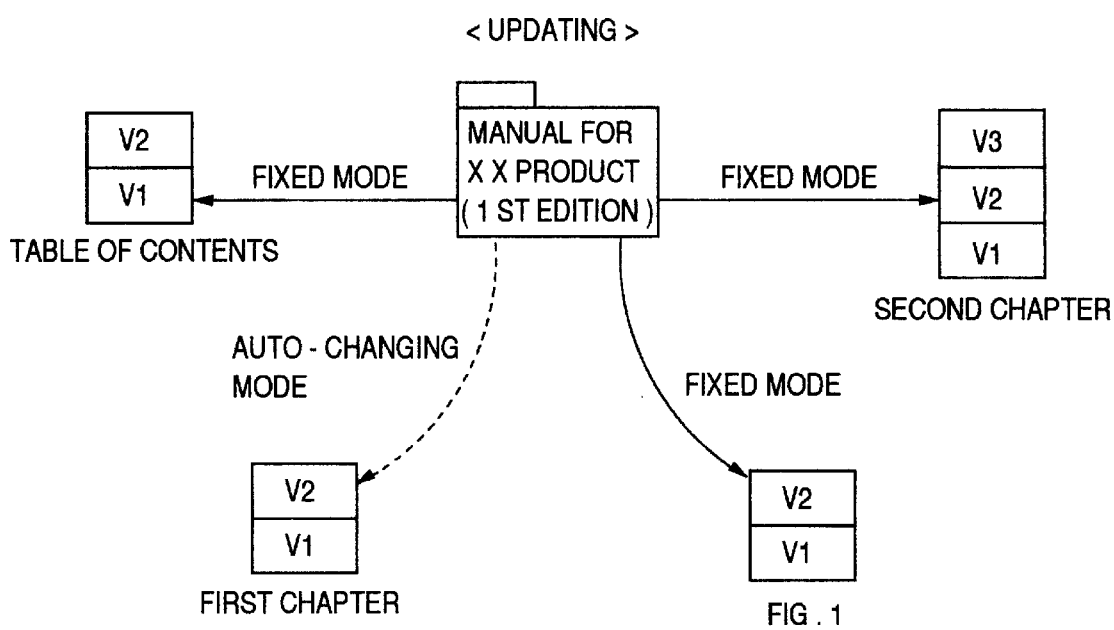
FIG. 17 is a diagram representing a state of a configuration management folder in the document editing process according to the present invention.

Consequently, the configuration management folder "manual for xx product (1st edition)" is changed as shown in FIG. 17. That is, the "FIG. 1 (fig1.bmp)" in the auto-changing mode is updated to V2 and is changed to the fixed mode. Further, the version V1 of the "table of contents (mokuji.doc)" and the version V2 of the "second chapter (chap2.doc)" in the fixed mode are registered as they are, respectively.

On December 4th, as the editing example shown in FIG. 13, the "first chapter (chap1.doc)" and the "FIG. 1 (fig1.bmp)" are edited and the version up mode of the "first chapter (chap1.doc)" is set to the fixed mode. At this time, even when the "FIG. 1 (fig1.bmp)" is edited and a new version thereof is prepared, the version V2 of the "FIG. 1 (fig1.bmp)" is the components instead of V3 since the version up mode of the "FIG. 1 (fig1.bmp)" is the fixed mode.

Figure 18:
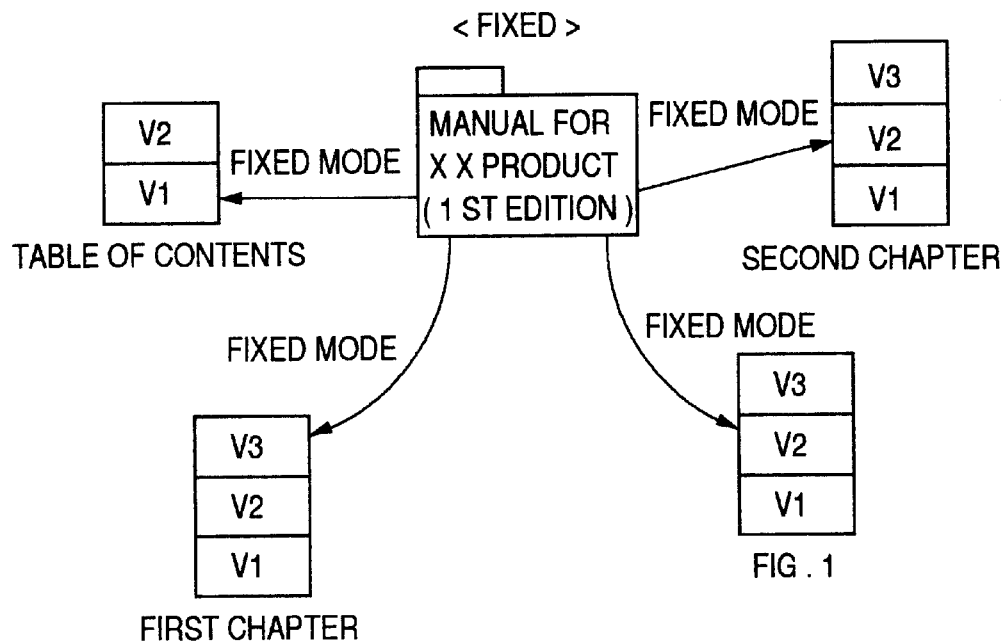
FIG. 18 is a diagram representing a state of a configuration management folder in the document editing process according to the present invention.

Consequently, the configuration management folder "manual for xx product (1st edition)" is changed as shown in FIG. 18. That is, the "first chapter (chap1.doc)" in the auto-changing mode is updated to V3 and is set to the fixed mode. The version V2 of "FIG. 1 (bmp)" in the fixed mode is registered as it is.

Further, since the version up modes of all the components are set to the fixed mode, the configuration management folder itself is also set from the updating mode to the fixed mode.

As described above, the user can set the version up mode to the fixed mode to thereby register any version in the configuration management folder. The user can continue writing successively while any version is registered to thereby prepare a new version, so that the user can make the writing work at the user's pace. In this manner, the efficiency of the group work can be improved.

A definite example of the document reference processing in the embodiment is now described.

It is assumed that the user performs editing as shown in FIG. 13 in the document example of FIG. 11.

A document obtained in the prior art is an aggregate of latest versions of individual components. In the present invention, however, editing can be performed successively while any past versions are left registered in the configuration management folder and a new version can be prepared. A document which is an aggregate of any past versions can be obtained.

Figure 19:
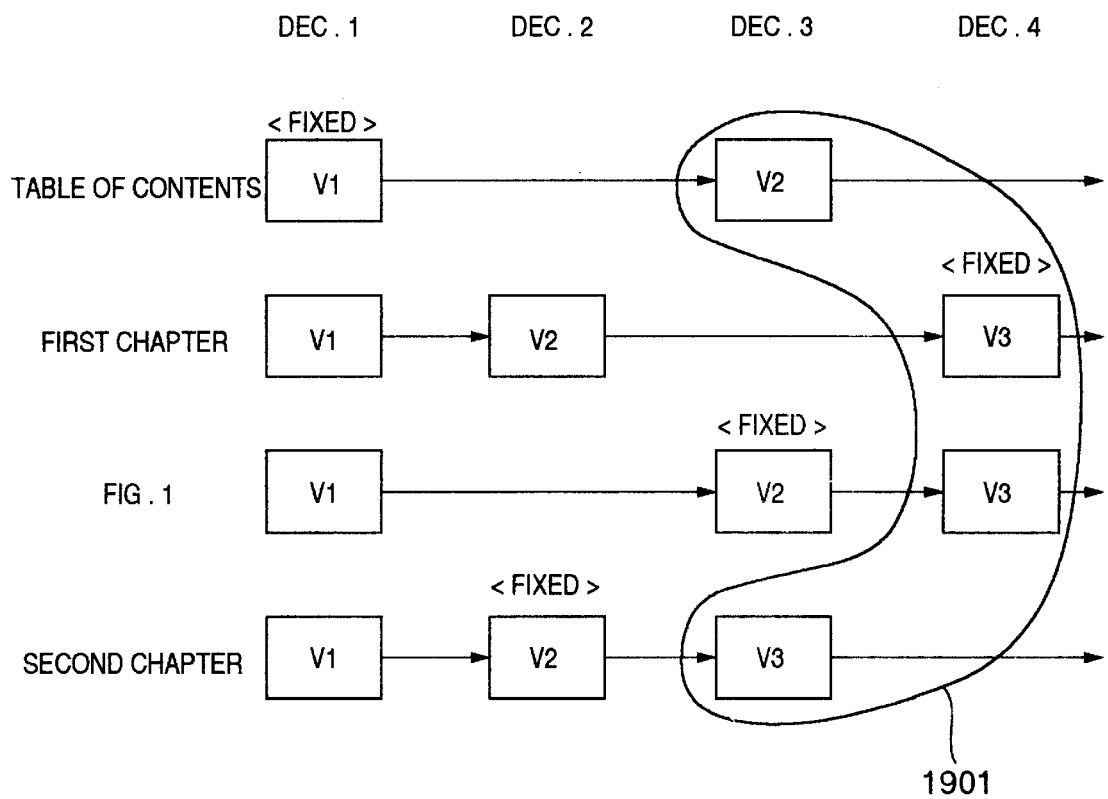
FIG. 19 is a diagram for explaining a document reference method in a prior art.

For example, in the editing example shown in FIG. 13, the "manual for xx product (1st edition)" capable of being obtained in the prior art at the time of December 4th is limited to an aggregate of the version V2 of the "table of contents", the version V3 of the "first chapter", the version V3 of the "FIG. 1" and the version V3 of the "second chapter" which are latest versions at that time as shown by 1901 of FIG. 19.

Figure 20:
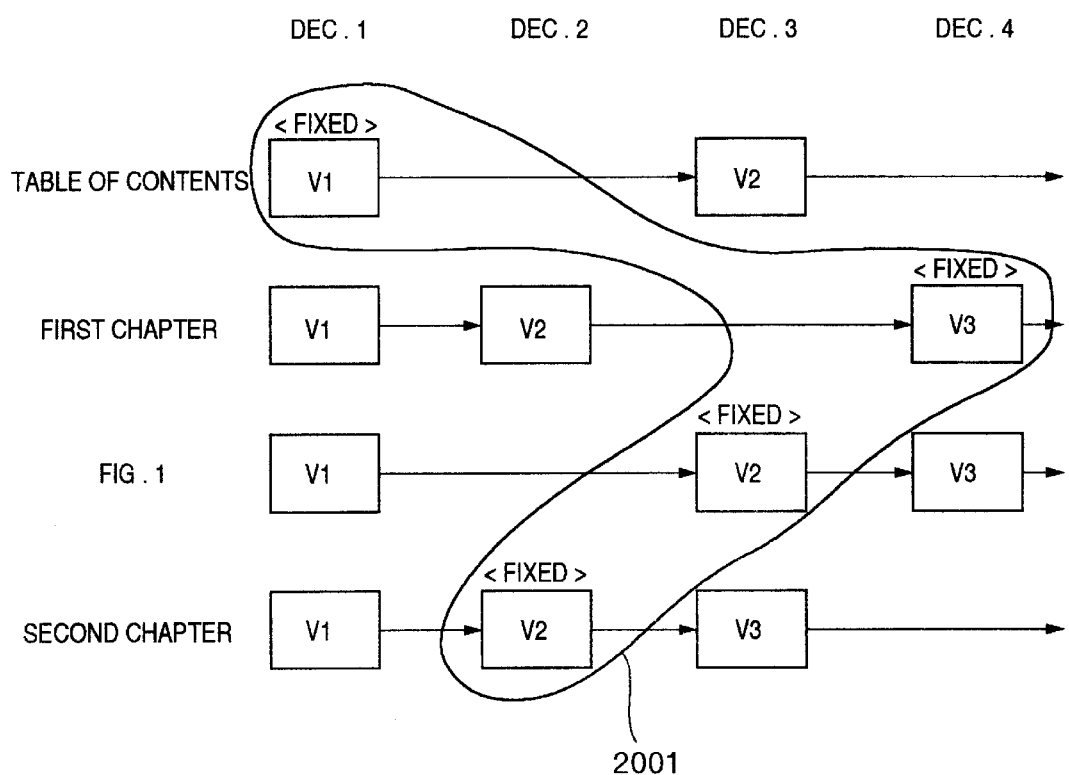
FIG. 20 is a diagram for explaining a document reference method according to the present invention.

On the contrary, according to the present invention, the "manual for xx product (1st edition)" at the time of December 4th, for example, composed of an aggregate of the version V1 of the "table of contents", the version V3 of the "first chapter", the version V2 of the "FIG. 1" and the version V2 of the "second chapter" can be obtained with reference to the configuration information management table 121 with version up mode at the time of December 4th as shown by 2001 of FIG. 20.

A definite document reference processing is now described.

First, at step 301 (FIG. 3), configuration information is obtained. The configuration management folder at the time of December 4th, for example, is in the state as shown in FIG. 18.

At next step 302 (FIG. 2), the document corresponding to the version numbers of the components obtained at step 301 (FIG. 3) is obtained from the secondary memory unit 106a. In this example, the version V1 of the "table of contents", the version V3 of the "first chapter", the version V2 of the "FIG. 1" and the version V2 of the "second chapter" are obtained.

At step 303 (FIG. 3), the document obtained at step 302 (FIG. 3) is displayed.

Finally, at step 304 (FIG. 3), whether the user finishes the reference or not is determined. When the reference is performed successively, the process is returned to step 301.

As described above, the document can be obtained on the basis of the configuration information which is registered in the configuration information management table 121 with version up mode.

Accordingly, the versions of the components desired by the user, that is, latest versions of components in the auto-changing mode and versions of components in the fixed mode can be obtained without any burden of the version management and the configuration management on the user and the document constituted by these versions can be obtained.

The foregoing is the description of the first embodiment according to the present invention.

A second embodiment of the present invention is now described with reference to the drawings.

Figure 21:
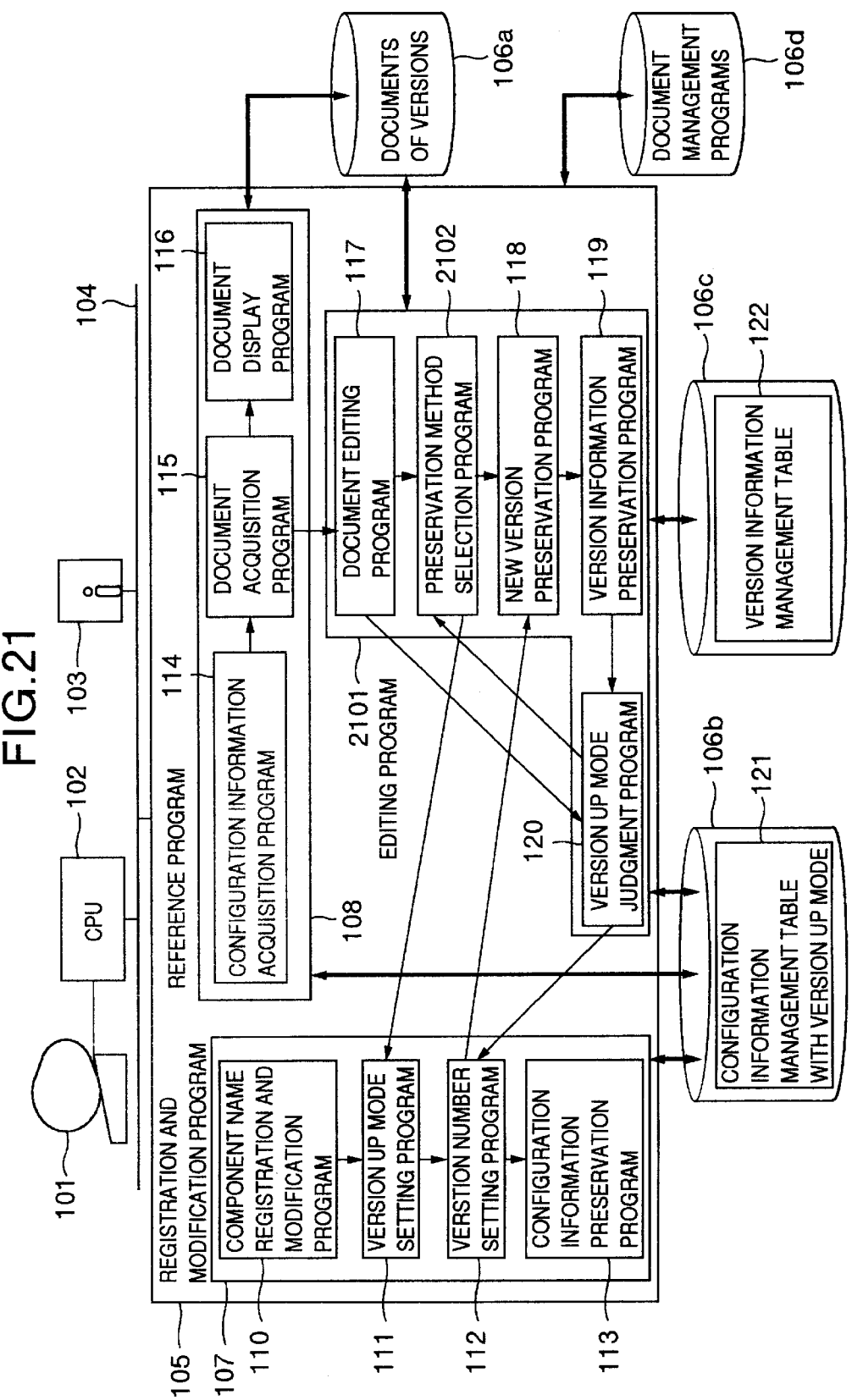
FIG. 21 is a diagram schematically illustrating a second embodiment according to the present invention.

The configuration of the embodiment is shown in FIG. 21.

In the embodiment, a preservation method selection program 2102 is added to the editing program 109 of the first embodiment shown in FIG. 1 to constitute a new editing program 2101.

Figure 22:
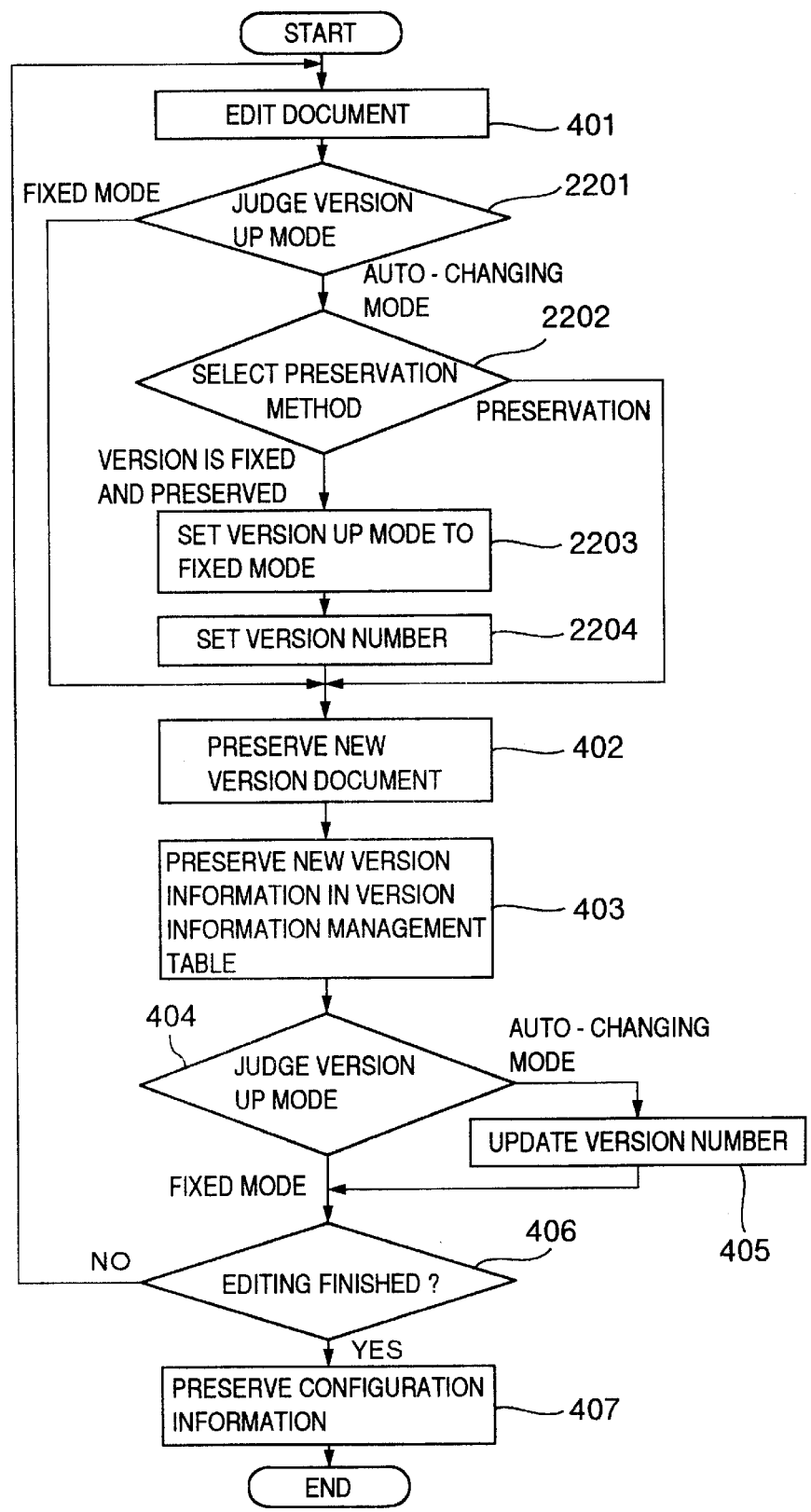
FIG. 22 is a flow chart showing a document editing processing procedure in the second embodiment according to the present invention.

The document editing processing procedure in the embodiment is now described with reference to a flow chart shown in FIG. 22. The document editing processing procedure shown in FIG. 22 is basically identical with that of FIG. 4 except that steps 2201 to 2204 are added newly.

When the user edits a document, the document is first edited at step 401.

At step 2201, the version up mode judgment program 120 is executed before the document edited by the user is preserved as a new version, so that the version up mode of the edited component is judged with reference to the configuration information management table 121 with version up mode.

When it is judged at step 2201 that the version up mode of the edited component is the "auto-changing mode", the preservation method selection program 2102 is executed, so that a picture for causing the user to select any preservation method of "preservation" or "version is fixed and preserved" is displayed, so that the user selects the preservation method.

On the other hand, when it is judged at step 2201 that the version up mode of the edited component is the "fixed mode", step 402 is executed.

When the user selects the method of "version is fixed and preserved" at step 2202, the version up mode setting program 111 is executed at step 2203 so that the version up mode of the edited component in the configuration information management table 121 with version up mode is set to the fixed mode.

Further, the version number setting program 112 is executed at step 2204 so that the version number of the edited component in the configuration information table 121 with version up mode is updated.

On the other hand, at step 2202, when the user selects the method of "preservation", the process proceeds to step 402.

At step 402, the edited document is preserved as a new version.

At next step 403, version information of the new version is preserved.

At step 404, the version up mode of the edited component is judged.

When it is judged at step 404 that the version up mode of the edited component is the "auto-changing mode", the version number is updated at step 405.

On the other hand, when it is judged at step 404 that the version up mode of the edited component is the "fixed mode", the version number is not edited and the process proceeds to step 406.

At next step 406, it is judged whether the user finishes the editing of the document or not. When editing is designated successively, the process is returned to step 401.

When the user has finished the editing in the above steps, the configuration information is preserved at step 407.

A definite example of the document editing processing in the second embodiment is now described.

It is assumed that the components are registered in the configuration management folder "manual for xx product (1st edition)" as shown in FIG. 10.

First, at step 401 (FIG. 22) the user edits a document. In this example, it is assumed that the version V1 of the "second chapter" is edited.

At step 2201 (FIG. 22), the version up mode of the component is judged before the user preserves the edited document as a new version. As shown in FIG. 10, it is understood that the version up mode 1008 of the "second chapter" is the auto-changing mode.

Since it is judged at step 2201 (FIG. 22) that the version up mode of the "second chapter" is the auto-changing mode, a picture for causing the user to select any preservation method of "preservation" or "version is fixed and preserved" is displayed at step 2202 (FIG. 22), so that the user selects the preservation method.

Figure 23:
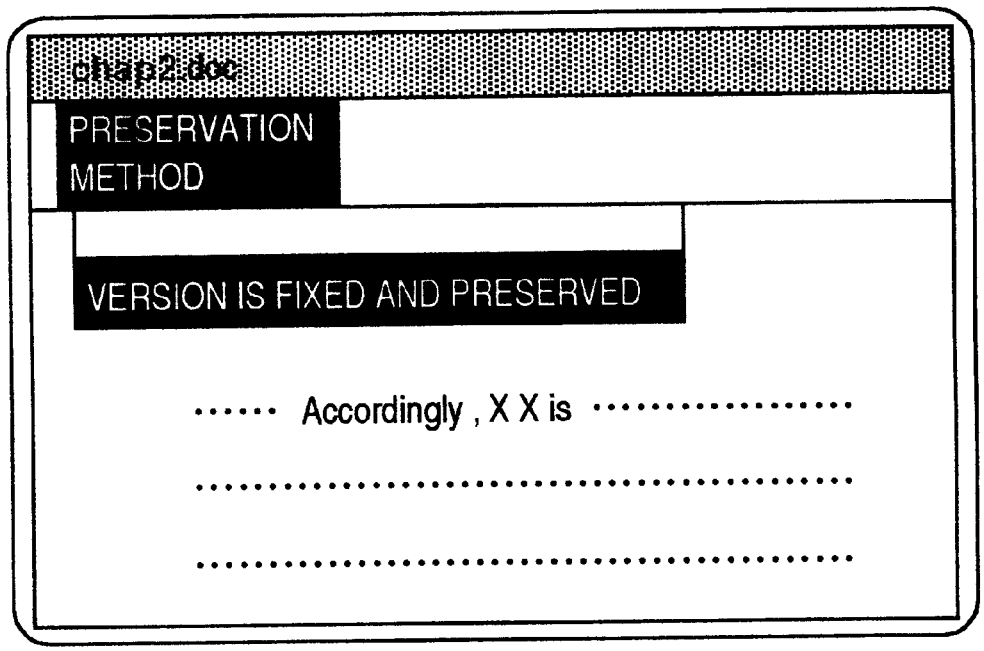
FIG. 23 is a diagram representing a graphical user interface (GUI) for selecting a document preservation method in the second embodiment according to the present invention.

FIG. 23 shows a user operated picture in the preservation method selection processing. In this example, the preservation method of "version is fixed and preserved" is selected as shown in FIG. 23.

Since the user selects the preservation method of "version is fixed and preserved", the version up mode of the edited component is set to the fixed mode at step 2203 (FIG. 22). In this example, the version up mode 1008 of the "second chapter" of FIG. 10 is changed from the auto-changing mode to the fixed mode.

Further, the version number setting program 112 is executed at step 2204 (FIG. 22) so that the version number of the edited component in the configuration information management table 121 with version up mode is updated. In this example, the version number 1009 of the "second chapter" of FIG. 10 is updated from V1 to V2.

At next step 402 (FIG. 22), the edited document is preserved as a new version. When the user edits the version V1 of the "second chapter" and designates to preserve it, a new version V2 of the "second chapter" is prepared and preserved.

At next step 403, version information of the new version is preserved. In this example, the version information of the version V2 of the "second chapter" is preserved.

Then, at step 404 (FIG. 22), the version up mode of the edited component is judged. Since it is judged that the version up mode of the "second chapter" is the "fixed mode", the version number is not updated and the process proceeds to step 406 (FIG. 22).

At next step 406 (FIG. 22), whether the user finishes the editing of the document or not is determined. When the user performs editing successively, the process is returned to step 401.

After the user has finished the editing in the above steps, the configuration information preservation program 113 is executed at step 407 (FIG. 22) so that the components described in the configuration information management table 121 with version up mode are preserved in the secondary memory unit 106*b*.

The user can select any of the two preservation methods after editing of the document according to the above procedure. When the user selects the preservation method of "the version is fixed and preserved", not only the version registered in the configuration management folder is updated but also the version up mode is changed. Accordingly, the user can register any version as the fixed mode without the necessity that the user sets the version up mode purposely.

The foregoing is the description of the second embodiment according to the present invention.

A third embodiment of the present invention is now described with reference to the drawings.

Figure 24:
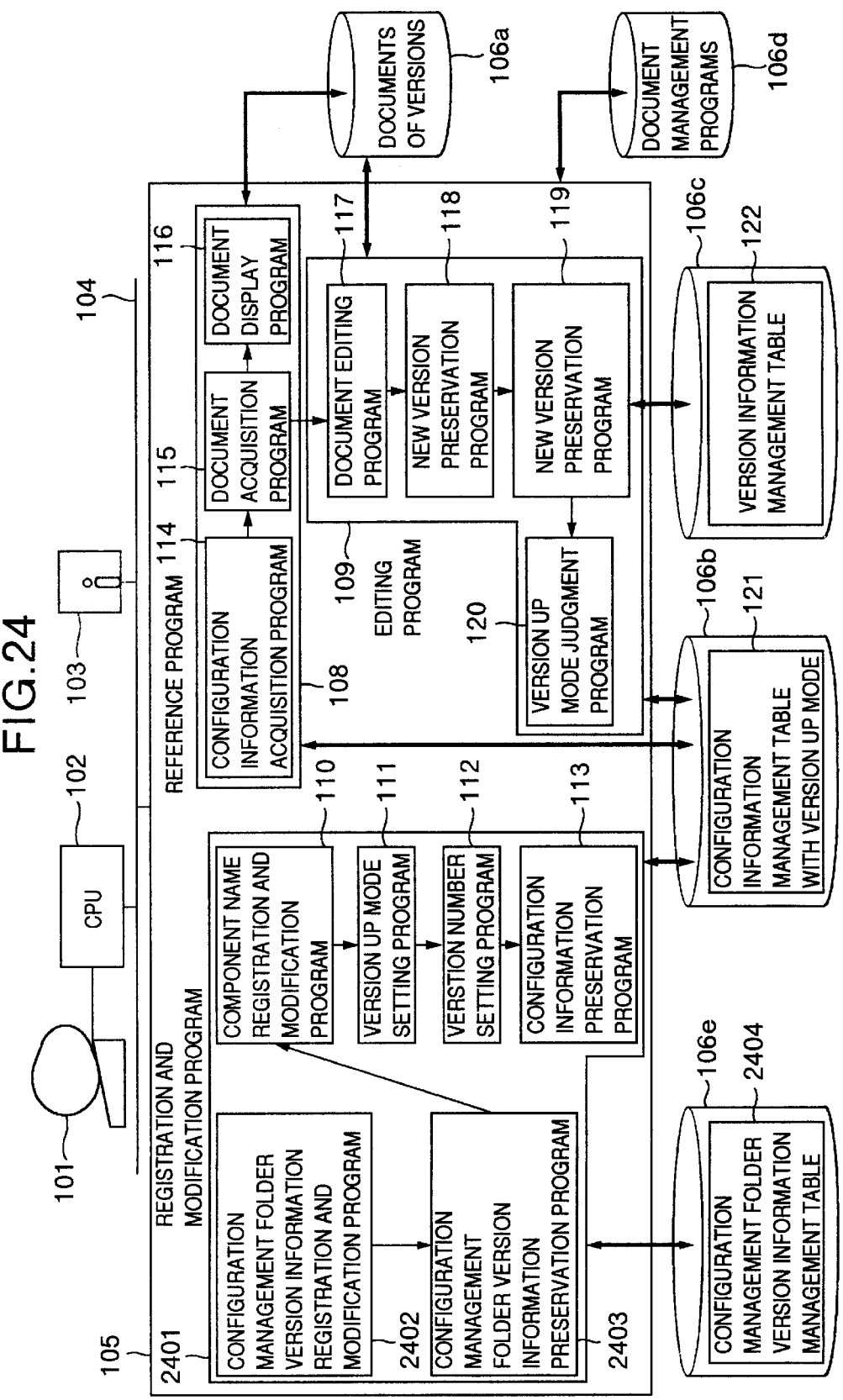
FIG. 24 is a diagram schematically illustrating a third embodiment according to the present invention.

The configuration of the embodiment is first shown in FIG. 24.

In the embodiment, a secondary memory unit 106*e* in which a configuration management folder version information management table 2404 is stored and a configuration management folder version information registration and modification program 2402 and a configuration management folder version information preservation program 2403 added in the registration and modification program 107 to constitute a new registration and modification program 2401 are added to the configuration of the first embodiment shown in FIG. 1.

Figure 25:
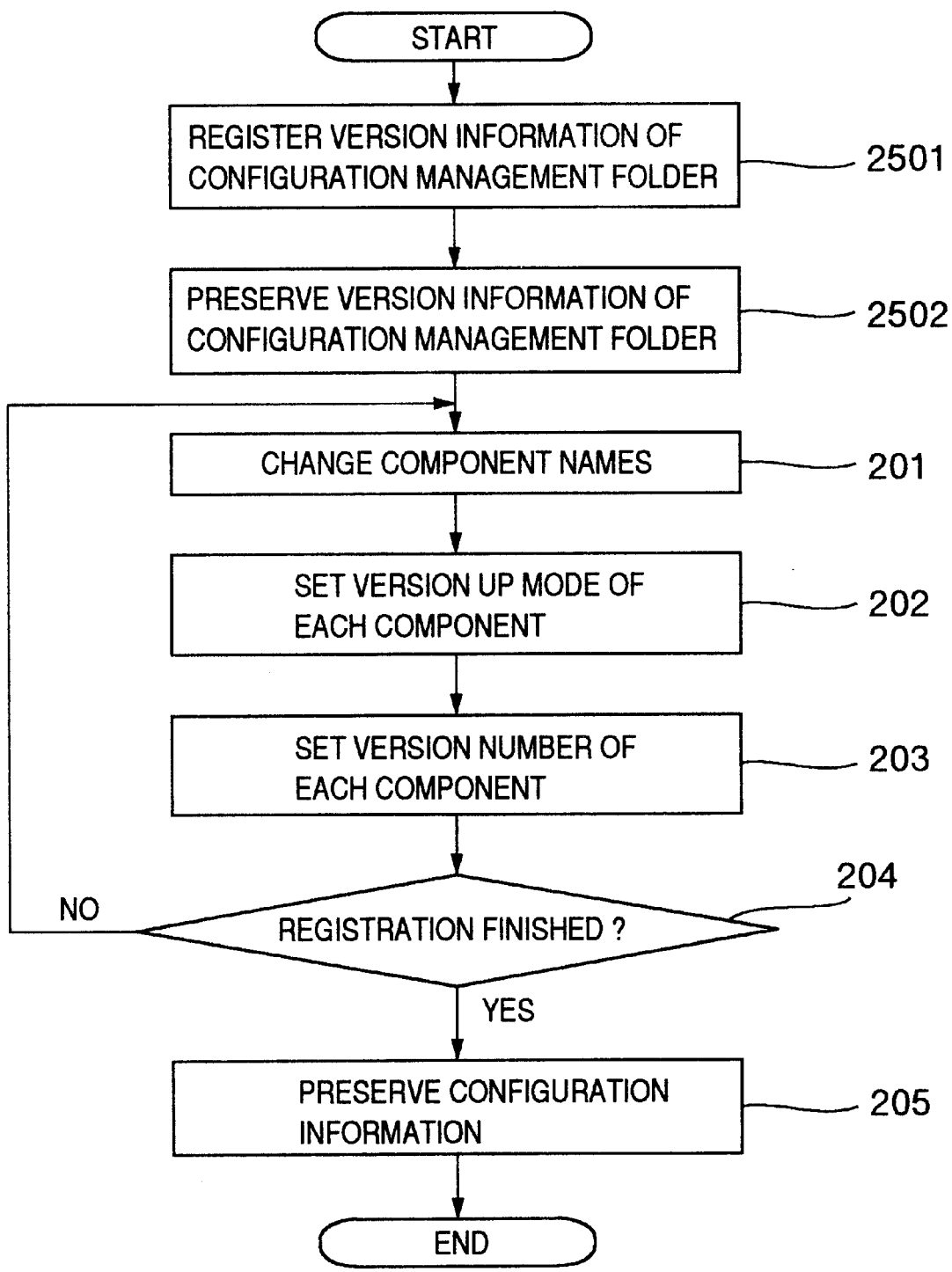
FIG. 25 is a flow chart showing a registration and modification processing procedure of configuration information in the third embodiment according to the present invention.

The configuration information registration and modification processing procedure in the embodiment is now described with reference to a flow chart shown in FIG. 25. The configuration information registration and modification processing procedure shown in FIG. 25 is basically identical with that of FIG. 2 except that steps 2501 and 2502 are added newly.

When the user sets the version up modes of all components in the configuration management folder to the fixed mode, the configuration management folder itself becomes in the fixed state.

When the user performs the version up operation of the configuration management folder, the configuration management folder version information registration and modification program 2402 is executed at step 2501 to prepare the configuration management folder of a new version.

The configuration management folder version information such as the version number, the preparation date, the state and the fixed date of the configuration management folder itself is registered in the configuration management folder version information management table 2404.

Next, the configuration management folder version information preservation program 2403 is executed at step 2502 so that the configuration management folder version information described in the configuration management folder version information management table 2404 registered at step 2501 is preserved in the secondary memory unit 106e.

When the configuration management folder of the new version is prepared in the above steps, the configuration information described in the configuration information management table with version up mode in the configuration management folder of the new version is as follows.

That is, the components inherit the components registered in the configuration management folder of a previous version as they are. The auto-changing mode is set in all of the version up modes and the latest version numbers of the components are set in the version numbers. Then, steps 201 to 205 are executed so that the user registers and changes the components.

A definite example of the component information registration and modification processing in the third embodiment is now described.

The user edits the components of the configuration management folder "manual for xx product (1st edition)" and the components are assumed to be currently registered as shown by 2601 of FIG. 26. In this case, since the version up modes of all the components are set to the fixed mode, the configuration management folder itself is in the fixed state (2602). Further, states 2701, fixed dates 2702 and the like of the folders are recorded in a version information management table 2404 of the configuration management folder shown in FIG. 27.

It is assumed that the user considers that the "manual for xx product (1st edition)" has been completed and accordingly desires to prepare a "manual for xx product (2nd edition)" newly. In this case, the user can select 2803 in the user operated picture shown in FIG. 28 to thereby update the version of the configuration management folder.

When the user performs the version up operation of the configuration management folder, the configuration management folder "manual for xx product (2nd edition)" 2603 of a new version is first prepared at step 2501 (FIG. 25).

The configuration management folder version information such as a preparation date (2703) and a state (2704) of the configuration management folder "manual for xx product (2nd edition)" 2603 is registered in the configuration management folder version information management table 2404 of FIG. 27.

At next step 2502 (FIG. 25), the configuration management folder version information is preserved in the secondary memory unit 106e.

When the configuration management folder of the new version is prepared in the above steps, the configuration information in the configuration management folder of the new version is as shown by 2603. That is, the components 2605 inherit the components registered in the configuration management folder "manual for xx product (1st edition)" 2601 of the previous version as they are. The auto-changing mode is set in all of the version up mode fields 2606 and the latest version numbers of the components are set in the version number fields 2607.

Then, steps 201 to 205 are executed so that the user performs registration and modification of the configuration information.

First, at step 201 (FIG. 25), the components are edited and changed.

For example, when there is any component to be added to or deleted from the configuration management folder "manual for xx product (2nd edition)" 2603, it is possible to change or modify the component at this step.

At next step 202 (FIG. 25), the version up modes of the components are set.

For example, when there is any component desired to be changed to the fixed mode in the configuration management folder "manual for xx product (2nd edition)" 2603, the fixed mode can be set at this step.

At next step 203 (FIG. 25), the version numbers of the components are set. As described above, when the version of the configuration management folder is updated, the latest versions are registered to all of the components and accordingly when it is desired to register the past version or the like, it can be set at this step.

At step 204 (FIG. 25), whether the user finishes the registration and the modification of the components or not is determined. When a new component is desired to be registered or when a component name, a version up mode or a version number of a component is desired to be changed, the process is returned to step 201.

After the user has finished the registration or modification of the configuration information to the configuration management folder in the above steps, the configuration information preservation program 113 is executed at step 205 to preserve the configuration information.

As described above, when the version of the configuration management folder can be updated, the relation between the past versions of the components can be preserved in a certain configuration management folder and a configuration management folder of a new version can be prepared.

Consequently, it is not necessary to prepare a new configuration management folder and register similar components therein again purposely. Further, it is possible to manage the relation between the configuration management folders and the relation between the components.

Figure 9:
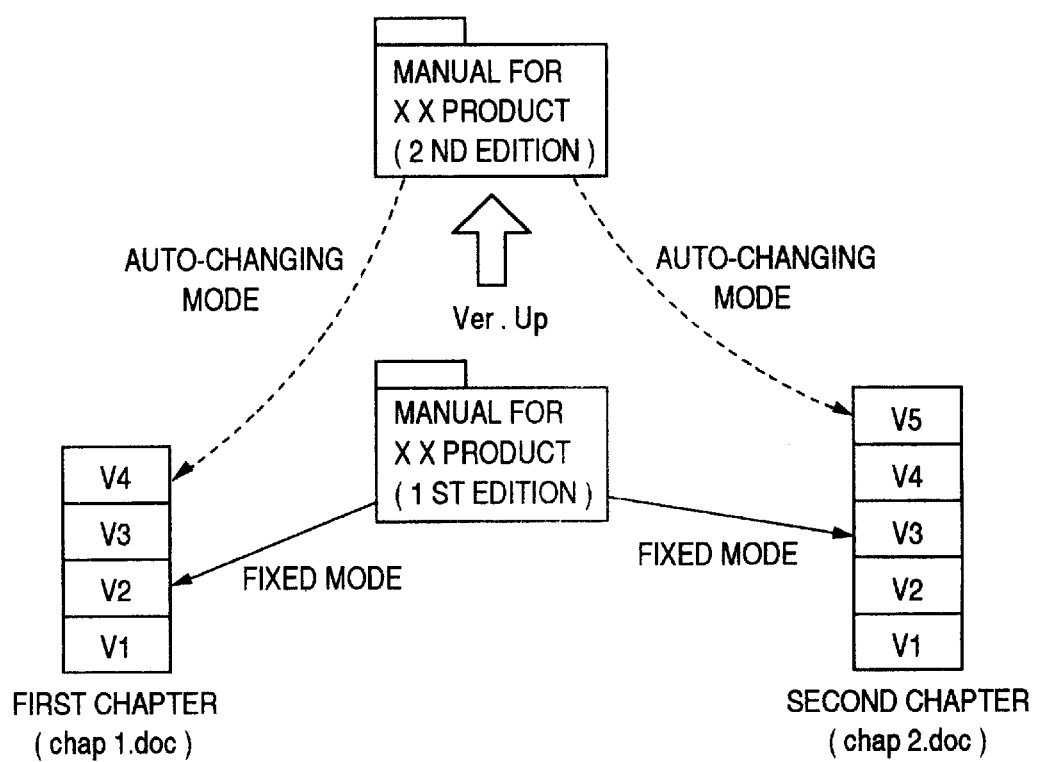
FIG. 9 is a diagram for explaining version up or update of a configuration management folder according to the present invention.

For example, FIG. 9 is a diagram showing the version up of the configuration management folder. The version V2 of the "first chapter" and the version V3 of the "second chapter" are registered in the configuration management folder "manual for xx product (1st edition)" and the version V4 of the "first chapter" and the version V5 of the "second chapter" are registered in the "manual for xx product (2nd edition)".

When attention is paid to the components, the version V2 of the "first chapter", for example, is registered in the "manual for xx product (1st edition)" and the version V4 thereof is registered in the "manual for xx product (2nd edition)". In this manner, the configuration management folders for registration of the components are different depending on the versions, while the relation between the versions is not disconnected and is continued from V1 to V4. Accordingly, any past version can be obtained and it is easy to manage the history of modification or change.

Further, when the configuration of documents registered in the configuration management folder is changed, that is, when the number of components is increased or decreased, it is possible to manage the changed state of the configuration management folder itself. Moreover, deletion of the disk capacity is realized as compared with preparation of an independent configuration management folder.

With regard to setting of the version up mode in the configuration management folder, the user can arrange all components to set them to the fixed mode.

As shown by 2801 of FIG. 28, the user can perform the fixing operation of the configuration management folder to thereby set the version up modes of all components to the fixed mode.

On the other hand, the user can select 2802 of FIG. 28 to set the configuration management folder to the updating state, so that the version up modes of all components can be set to the auto-changing mode.

Further, when the version of the configuration management folder is updated, it is not necessary that the version up modes of all components are the fixed mode as described at the beginning of the embodiment. As shown by 2803 of FIG. 28, the user can perform the operation of updating the version of the configuration management folder to thereby set the version up modes of all the components to the fixed mode and prepare the configuration management folder of a new version.

The foregoing is the description of the third embodiment of the present invention.

As described above, according to the version management method and the configuration management method of the present invention, management of the versions of the configuration management folder which is an aggregate of components can be attained in addition to management of relation between the versions of the components. Consequently, a document at any past time can be obtained, the writing work can be made at an independent pace for each component and so on, so that large effect can be obtained in the group writing work.

What is claimed is:

1. A version and configuration management method in a project management system including a processing unit, a memory unit and a terminal unit and for managing a project including a plurality of components by using a configuration management folder, said method comprising:

assigning each of said components one of an auto-changing mode in which a version number and a version of component referred by said configuration management folder to be managed of said project are updated successively and a fixed mode in which said version number and said version of said component referred by said configuration management folder are not updated and a new version of said component is prepared;

updating each of said components based on said mode assigned to each of said components; and judging whether a component is present in said configuration information management table preserved in said memory unit or not and when said corresponding component is present, judging a version up mode of said corresponding component in said configuration information management table so that when said Judged result is the auto-changing mode, a version number of said corresponding component is changed to said updated version number and when said judged result is the fixed mode, said version number of said corresponding component is not changed.

2. A version and configuration management method in a project management system including a processing unit, a memory unit and a terminal unit and for managing a project including a plurality of components by using a configuration management folder, comprising:

assigning each of said components one of an auto-changing mode and a fixed mode;

registering information including names of components to be managed of said project, names of files in which said components are stored, version numbers of said components and version up modes each representing one of said auto-changing mode in which versions of said components referred by said configuration management folder are automatically updated and said fixed mode in which said versions of said components referred by such configuration management folder are not updated into a configuration information management table with version up mode or updating said information in said table and preserving said table in said memory unit;

updating, when a component of said project is edited, a version number of said edited component of said project to be preserved in said memory unit and updating a version information management table corresponding to said edited component of said project to be preserved in said memory unit; and judging whether a component corresponding to said edited component of said project is present in said configuration information management table preserved in said memory unit or not and when said corresponding component is present, judging a version up mode of said corresponding component in said configuration information management table so that when said judged result is the auto-changing mode, a version number of said corresponding component is changed to said updated version number and when said judged result is the fixed mode, said version number of said corresponding component is not changed.

3. A version and configuration management method according to claim 2, wherein when said component of said project is edited, it is judged whether a component corresponding to said edited component of said project is present in said configuration information management table or not before said version number of said edited component of said project is updated to be preserved in said memory unit and when said corresponding component is present, a version up mode of said corresponding component in said table is judged so that when said judged result is the auto-changing mode, an indication for causing a user to select any preservation method of "preservation" or "version is fixed and preserved" is made so that the user can select said preservation method.

4. A version and configuration management method according to claim 2, wherein a configuration management folder version information management table for managing versions of said configuration management folder composed of said configuration information management table of said project having said information registered or updated and a name of said project is prepared for each of said folder and when a new version of said configuration management folder is prepared, configuration management folder version information including a version number, a preparation date, a folder state indicative of fixed state or updating state and a fixed date of said new version is registered in said configuration management folder version information management table, which is preserved in said memory unit, said configuration management folder version information management table preserved in said memory unit being updated when information for changing said configuration management folder version information is inputted.

5. A version and configuration management method according to claim 2, wherein said configuration information management table with version up mode is displayed in said terminal unit in response to a change request of the version up mode of the component in said configuration information management table and a menu picture for setting the version up mode of a component to the auto-changing mode or the fixed mode is displayed in said terminal unit in response to selection of a component to be changed, said version up mode of said component being changed in response to selection of any of the auto-changing mode or the fixed mode in said menu when it is selected.

6. A version and configuration management apparatus in a project management system including a processing unit, a memory unit and a terminal unit and for managing a project including a plurality of components by using a configuration management folder, comprising:

means for assigning each of said components one of an auto-changing mode and a fixed mode;

means for registering information including names of components to be managed of said project, names of files in which said components are stored, version numbers of said components and version up modes each representing one of said auto-changing mode in which versions of said components referred by said configuration management folder are automatically updated and said fixed mode in which the versions of said components referred by said configuration management folder are not updated into a configuration information management table with version up mode or updating said information in said table and preserving said table in said memory unit;

means for updating, when a component of said project is edited, a version number of said edited component of said project to be preserved in said memory unit and updating a version information management table corresponding to said edited component of said project to be preserved in said memory unit; and means for judging whether a component corresponding to said edited component of said project is present in said configuration information management table preserved in said memory unit or not and when said corresponding component is present, judging a version up mode of said corresponding component in said configuration information management table so that when said judged result is the auto-changing mode, a version number of said corresponding component is changed to said updated version number and when said judged result is the fixed mode, a version number of said corresponding component is not changed.

7. A computer readable recording medium for recording therein a version and configuration management table program for managing a project including a plurality of components by using a configuration management folder, said program comprising:

procedure for assigning each of said components one of an auto-changing mode and a fixed mode;

procedure for registering information including names of components to be managed of said project, names of files in which said components are stored, version numbers of said components and version up modes each representing one of said auto-changing mode in which versions of said components referred by said configuration management folder are automatically updated and said fixed mode in which said versions of said components referred by said configuration management folder are not updated into a configuration information management table with version up mode or updating said information in said table and preserving said table in a memory unit;

procedure for updating, when a component of said project is edited, a version number of said edited component of said project to be preserved in said memory unit and updating a version information management table corresponding to said edited component of said project to be preserved in said memory unit; and procedure for judging whether a component corresponding to said edited component of said project is present in said configuration information management table preserved in said memory unit or not and when said corresponding component is present, judging a version up mode of said corresponding component in said configuration information management table so that when said judged result is the auto-changing mode, a version number of said corresponding component is changed to said updated version number and when said judged result is the fixed mode, a version number of said corresponding component is not changed.

\* \* \* \* \*